US010331222B2

(12) United States Patent
Kim et al.

(10) Patent No.: US 10,331,222 B2
(45) Date of Patent: *Jun. 25, 2019

(54) GESTURE RECOGNITION TECHNIQUES

(71) Applicant: Microsoft Technology Licensing, LLC, Redmond, WA (US)

(72) Inventors: David Kim, Cambridge (GB); Otmar D. Hilliges, Cambridge (GB); Shahram Izadi, Cambridge (GB); Patrick L. Olivier, York (GB); Jamie Daniel Joseph Shotton, Cambridge (GB); Pushmeet Kohli, Cambridge (GB); David G. Molyneaux, Cambridge (GB); Stephen E. Hodges, Cambridge (GB); Andrew W. Fitzgibbon, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,905

(22) Filed: May 24, 2016

(65) Prior Publication Data

US 2016/0370867 A1 Dec. 22, 2016

Related U.S. Application Data

(63) Continuation of application No. 14/280,140, filed on May 16, 2014, now Pat. No. 9,372,544, which is a (Continued)

(51) Int. Cl.
*G06F 3/01* (2006.01)
*G06K 9/00* (2006.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
None
See application file for complete search history.

(56) References Cited

U.S. PATENT DOCUMENTS 4,288,078 A 9/1981 Lugo
4,627,620 A 12/1986 Yang
(Continued)

FOREIGN PATENT DOCUMENTS

CA 2775700 A1 7/2012
CA 2775814 A1 7/2012
(Continued)

OTHER PUBLICATIONS

Sharma, Rajeev et al., "Method of Visual and Acoustic Signal Co-Analysis for Co-Verbal Gesture Recognition," U.S. Appl. No. 60/413,998, filed Sep. 19, 2002, 16 pages.
(Continued)

*Primary Examiner* — Joseph R Haley
*Assistant Examiner* — Emily J Frank
(74) *Attorney, Agent, or Firm* — Alleman Hall Creasman & Tuttle LLP

(57) ABSTRACT

In one or more implementations, a static geometry model is generated, from one or more images of a physical environment captured using a camera, using one or more static objects to model corresponding one or more objects in the physical environment. Interaction of a dynamic object with at least one of the static objects is identified by analyzing at least one image and a gesture is recognized from the
(Continued)

identified interaction of the dynamic object with the at least one of the static objects to initiate an operation of the computing device.

20 Claims, 7 Drawing Sheets

Related U.S. Application Data continuation of application No. 13/118,884, filed on May 31, 2011, now Pat. No. 8,760,395.

(51) Int. Cl.
    *G06F 3/03*           (2006.01)
    *G06F 3/0481*       (2013.01)
    *G06T 7/73*           (2017.01)

(52) U.S. Cl.
    CPC ..... *G06F 3/04815* (2013.01); *G06K 9/00355* (2013.01); *G06T 7/75* (2017.01); *G06T 2207/10028* (2013.01); *G06T 2207/30196* (2013.01)

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 4,931,865 A | 6/1990 | Scarampi |
| 5,101,444 A | 3/1992 | Wilson et al. |
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,805,167 A | 9/1998 | van Cruyningen |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 3/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 5,999,766 A | 12/1999 | Hisatomi et al. |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama et al. |
| 6,115,482 A | 9/2000 | Sears et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 | 1/2001 | Liu |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 | 9/2001 | Liu |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 | 2/2003 | Liu |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,622,119 B1 | 9/2003 | Ramaswamy et al. |
| 6,633,294 B1 | 10/2003 | Rosenthal et al. |

(56) References Cited

U.S. PATENT DOCUMENTS

| | | |
|---|---|---|
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Seeley et al. |
| 6,863,383 B2 | 3/2005 | Bangalore et al. |
| 6,873,723 B1 | 3/2005 | Aucsmith et al. |
| 6,876,496 B2 | 4/2005 | French et al. |
| 6,881,526 B2 | 4/2005 | Bobeck et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 | 10/2006 | Dryer et al. |
| 7,121,946 B2 | 10/2006 | Paul et al. |
| 7,134,130 B1 | 11/2006 | Thomas |
| 7,145,330 B2 | 12/2006 | Xiao |
| 7,151,530 B2 | 12/2006 | Roeber et al. |
| 7,155,305 B2 | 12/2006 | Hayes et al. |
| 7,162,082 B2 | 1/2007 | Edwards |
| 7,170,492 B2 | 1/2007 | Bell |
| 7,170,605 B2 | 1/2007 | Cromwell et al. |
| 7,184,048 B2 | 2/2007 | Hunter |
| 7,202,898 B1 | 4/2007 | Braun et al. |
| 7,212,665 B2 | 5/2007 | Yang et al. |
| 7,214,932 B2 | 5/2007 | Brunfeld et al. |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |
| 7,246,329 B1 | 7/2007 | Miura et al. |
| 7,259,747 B2 | 8/2007 | Bell |
| 7,274,800 B2 | 9/2007 | Nefian et al. |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,385,519 B2 | 6/2008 | Weems, II |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,435,941 B2 | 10/2008 | Ayres |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,487,375 B2 | 2/2009 | Lourie et al. |
| 7,489,812 B2 | 2/2009 | Fox et al. |
| 7,512,889 B2 | 3/2009 | Newell et al. |
| 7,536,032 B2 | 5/2009 | Bell |
| 7,538,782 B2 | 5/2009 | Kuroki et al. |
| 7,555,142 B2 | 6/2009 | Hildreth et al. |
| 7,559,841 B2 | 7/2009 | Hashimoto |
| 7,560,701 B2 | 7/2009 | Oggier et al. |
| 7,568,116 B2 | 7/2009 | Dooley et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,636,456 B2 | 12/2009 | Collins et al. |
| 7,640,304 B1 | 12/2009 | Goldscheider |
| 7,643,056 B2 | 1/2010 | Silsby |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,140 B2 | 6/2010 | Vinson et al. |
| 7,746,345 B2 | 6/2010 | Hunter |
| 7,752,633 B1 | 7/2010 | Fleming |
| 7,760,182 B2 | 7/2010 | Ahmad et al. |
| 7,762,665 B2 | 7/2010 | Vertegaal et al. |
| 7,764,311 B2 | 7/2010 | Bill |
| 7,770,136 B2 | 8/2010 | Beeck et al. |
| 7,809,167 B2 | 10/2010 | Bell |
| 7,814,518 B2 | 10/2010 | Ducheneaut et al. |
| 7,834,846 B1 | 11/2010 | Bell |
| 7,836,480 B1 | 11/2010 | Harvey et al. |
| 7,852,262 B2 | 12/2010 | Namineni et al. |
| 7,889,073 B2 | 2/2011 | Zalewski |
| 7,895,076 B2 | 2/2011 | Kutaragi et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,081,302 B2 | 12/2011 | Paluszek et al. |
| 8,096,660 B2 | 1/2012 | Vertegaal et al. |
| 8,102,422 B1 | 1/2012 | Kenderov et al. |
| 8,132,187 B2 | 3/2012 | Klyuchevskyy |
| 8,141,775 B1 | 3/2012 | Aidasani et al. |
| 8,189,053 B2 | 5/2012 | Pryor |
| 8,260,740 B2 | 9/2012 | Davis et al. |
| 8,322,856 B2 | 12/2012 | Vertegaal et al. |
| 8,327,395 B2 | 12/2012 | Lee et al. |
| 8,332,883 B2 | 12/2012 | Lee et al. |
| 8,418,085 B2 | 4/2013 | Snook et al. |
| 8,471,868 B1 * | 6/2013 | Wilson .............. G06F 3/017 |
| | | 345/156 |
| 8,499,245 B1 | 7/2013 | Froment et al. |
| 8,522,289 B2 | 8/2013 | Athsani et al. |
| 8,620,113 B2 | 12/2013 | Yee |
| 8,635,637 B2 | 1/2014 | Krum et al. |
| 8,660,303 B2 | 2/2014 | Izadi et al. |
| 8,760,395 B2 * | 6/2014 | Kim .................. G06F 3/011 |
| | | 345/156 |
| 8,898,687 B2 | 11/2014 | Hulten et al. |
| 8,943,526 B2 | 1/2015 | Rivera et al. |
| 8,959,541 B2 | 2/2015 | Conrad et al. |
| 9,100,685 B2 | 8/2015 | Conrad et al. |
| 9,372,544 B2 * | 6/2016 | Kim .................. G06F 3/011 |
| 2001/0021994 A1 | 9/2001 | Nash |
| 2002/0041327 A1 | 4/2002 | Hildreth et al. |
| 2002/0072952 A1 | 6/2002 | Hamzy et al. |

(56) References Cited

U.S. PATENT DOCUMENTS

| | | |
|---|---|---|
| 2002/0073417 A1 | 6/2002 | Kondo et al. |
| 2002/0108000 A1 | 8/2002 | Iori et al. |
| 2002/0120925 A1 | 8/2002 | Logan |
| 2002/0144259 A1 | 10/2002 | Gutta et al. |
| 2002/0157095 A1 | 10/2002 | Masumitsu et al. |
| 2002/0174230 A1 | 11/2002 | Gudorf et al. |
| 2002/0174445 A1 | 11/2002 | Miller et al. |
| 2002/0178446 A1 | 11/2002 | Sie et al. |
| 2003/0001846 A1 | 1/2003 | Davis et al. |
| 2003/0005439 A1 | 1/2003 | Rovira |
| 2003/0007018 A1 | 1/2003 | Seni et al. |
| 2003/0033600 A1 | 2/2003 | Cliff et al. |
| 2003/0066071 A1 | 4/2003 | Gutta et al. |
| 2003/0074661 A1 | 4/2003 | Krapf et al. |
| 2003/0093784 A1 | 5/2003 | Dimitrova et al. |
| 2003/0112467 A1 | 6/2003 | McCollum et al. |
| 2003/0118974 A1 | 6/2003 | Obrador |
| 2003/0126593 A1 | 7/2003 | Mault |
| 2003/0141360 A1 | 7/2003 | De Leo et al. |
| 2003/0167358 A1 | 9/2003 | Marvin et al. |
| 2004/0001616 A1 | 1/2004 | Gutta et al. |
| 2004/0046736 A1 | 3/2004 | Pryor et al. |
| 2004/0056907 A1 | 3/2004 | Sharma et al. |
| 2004/0068409 A1 | 4/2004 | Tanaka et al. |
| 2004/0070573 A1 | 4/2004 | Graham |
| 2004/0113933 A1 | 6/2004 | Guler |
| 2004/0155962 A1 | 8/2004 | Marks |
| 2004/0168190 A1 | 8/2004 | Saari et al. |
| 2004/0189720 A1 | 9/2004 | Wilson et al. |
| 2004/0193413 A1 | 9/2004 | Wilson et al. |
| 2004/0196309 A1 | 10/2004 | Hawkins |
| 2004/0207597 A1 | 10/2004 | Marks |
| 2005/0010637 A1 | 1/2005 | Dempski et al. |
| 2005/0022239 A1 | 1/2005 | Meuleman |
| 2005/0059488 A1 | 3/2005 | Larsen et al. |
| 2005/0076365 A1 | 4/2005 | Popov et al. |
| 2005/0082480 A1 | 4/2005 | Wagner et al. |
| 2005/0190973 A1 | 9/2005 | Kristensson et al. |
| 2005/0212767 A1 | 9/2005 | Marvit et al. |
| 2005/0212911 A1 | 9/2005 | Marvit et al. |
| 2005/0215319 A1 | 9/2005 | Rigopulos et al. |
| 2005/0223237 A1 | 10/2005 | Barletta et al. |
| 2005/0229116 A1 | 10/2005 | Endler et al. |
| 2005/0229199 A1 | 10/2005 | Yabe |
| 2005/0234998 A1 | 10/2005 | Lesandrini et al. |
| 2005/0257166 A1 | 11/2005 | Tu |
| 2005/0271279 A1* | 12/2005 | Fujimura ............ G06K 9/00355 382/203 |
| 2005/0289582 A1 | 12/2005 | Tavares et al. |
| 2006/0020904 A1 | 1/2006 | Aaltonen et al. |
| 2006/0031776 A1 | 2/2006 | Glein et al. |
| 2006/0031786 A1 | 2/2006 | Hillis et al. |
| 2006/0055685 A1 | 3/2006 | Rimas-Ribikauskas et al. |
| 2006/0073816 A1 | 4/2006 | Kim et al. |
| 2006/0101349 A1 | 5/2006 | Lieberman et al. |
| 2006/0123360 A1 | 6/2006 | Anwar et al. |
| 2006/0158307 A1 | 7/2006 | Lee et al. |
| 2006/0174313 A1 | 8/2006 | Ducheneaut et al. |
| 2006/0184800 A1 | 8/2006 | Rosenberg |
| 2006/0188144 A1 | 8/2006 | Sasaki et al. |
| 2006/0188234 A1 | 8/2006 | Takeshita |
| 2006/0200780 A1 | 9/2006 | Iwema et al. |
| 2006/0210958 A1 | 9/2006 | Rimas-Ribikauskas et al. |
| 2006/0218573 A1 | 9/2006 | Proebstel |
| 2006/0239558 A1 | 10/2006 | Rafii et al. |
| 2006/0253793 A1 | 11/2006 | Zhai et al. |
| 2006/0262116 A1 | 11/2006 | Moshiri et al. |
| 2006/0271207 A1 | 11/2006 | Shaw |
| 2006/0280055 A1 | 12/2006 | Miller et al. |
| 2006/0282856 A1 | 12/2006 | Errico et al. |
| 2006/0282859 A1 | 12/2006 | Garbow et al. |
| 2007/0013718 A1 | 1/2007 | Ohba |
| 2007/0018973 A1 | 1/2007 | Shih et al. |
| 2007/0033607 A1 | 2/2007 | Bryan |
| 2007/0060336 A1 | 3/2007 | Marks et al. |
| 2007/0075978 A1 | 4/2007 | Chung |
| 2007/0098222 A1 | 5/2007 | Porter et al. |
| 2007/0098254 A1 | 5/2007 | Yang et al. |
| 2007/0140532 A1 | 6/2007 | Goffin |
| 2007/0143715 A1 | 6/2007 | Hollins et al. |
| 2007/0143787 A1 | 6/2007 | Cankaya |
| 2007/0150281 A1 | 6/2007 | Hoff |
| 2007/0150916 A1 | 6/2007 | Begole et al. |
| 2007/0203685 A1 | 8/2007 | Takano |
| 2007/0214292 A1 | 9/2007 | Hayes et al. |
| 2007/0216894 A1 | 9/2007 | Garcia et al. |
| 2007/0219430 A1 | 9/2007 | Moore |
| 2007/0260984 A1 | 11/2007 | Marks et al. |
| 2007/0271580 A1 | 11/2007 | Tischer et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0016544 A1 | 1/2008 | Lee et al. |
| 2008/0018591 A1 | 1/2008 | Pittel et al. |
| 2008/0026838 A1 | 1/2008 | Dunstan et al. |
| 2008/0027984 A1 | 1/2008 | Perdomo et al. |
| 2008/0033790 A1 | 2/2008 | Nickerson et al. |
| 2008/0059578 A1 | 3/2008 | Albertson et al. |
| 2008/0062257 A1 | 3/2008 | Corson |
| 2008/0065243 A1 | 3/2008 | Fallman et al. |
| 2008/0081694 A1 | 4/2008 | Hong et al. |
| 2008/0091512 A1 | 4/2008 | Marci et al. |
| 2008/0092159 A1 | 4/2008 | Dmitriev et al. |
| 2008/0100620 A1 | 5/2008 | Nagai et al. |
| 2008/0100825 A1 | 5/2008 | Zalewski |
| 2008/0124690 A1 | 5/2008 | Redlich |
| 2008/0126937 A1 | 5/2008 | Pachet |
| 2008/0134102 A1 | 6/2008 | Movold et al. |
| 2008/0151113 A1 | 6/2008 | Park |
| 2008/0152191 A1 | 6/2008 | Fujimura et al. |
| 2008/0163130 A1 | 7/2008 | Westerman |
| 2008/0163283 A1 | 7/2008 | Tan et al. |
| 2008/0178126 A1 | 7/2008 | Beeck et al. |
| 2008/0215972 A1 | 9/2008 | Zalewski et al. |
| 2008/0215973 A1 | 9/2008 | Zalewski et al. |
| 2008/0234023 A1 | 9/2008 | Mullahkhel et al. |
| 2008/0266328 A1 | 10/2008 | Fong |
| 2008/0310707 A1 | 12/2008 | Kansai et al. |
| 2009/0013366 A1 | 1/2009 | You et al. |
| 2009/0019397 A1 | 1/2009 | Buffet et al. |
| 2009/0025024 A1 | 1/2009 | Beser et al. |
| 2009/0027337 A1 | 1/2009 | Hildreth |
| 2009/0036764 A1 | 2/2009 | Rivas et al. |
| 2009/0037945 A1 | 2/2009 | Greig et al. |
| 2009/0051648 A1 | 2/2009 | Shamaie et al. |
| 2009/0070798 A1 | 3/2009 | Lee et al. |
| 2009/0072992 A1 | 3/2009 | Yun |
| 2009/0073136 A1 | 3/2009 | Choi |
| 2009/0085864 A1 | 4/2009 | Kutliroff et al. |
| 2009/0089225 A1 | 4/2009 | Baier et al. |
| 2009/0094627 A1 | 4/2009 | Lee et al. |
| 2009/0094628 A1 | 4/2009 | Lee et al. |
| 2009/0094629 A1 | 4/2009 | Lee et al. |
| 2009/0094630 A1 | 4/2009 | Brown |
| 2009/0106645 A1 | 4/2009 | Knobel |
| 2009/0112817 A1 | 4/2009 | Jung et al. |
| 2009/0116684 A1 | 5/2009 | Andreasson |
| 2009/0133051 A1 | 5/2009 | Hildreth |
| 2009/0141933 A1 | 6/2009 | Wagg |
| 2009/0143141 A1 | 6/2009 | Wells et al. |
| 2009/0146775 A1 | 6/2009 | Bonnaud et al. |
| 2009/0157472 A1 | 6/2009 | Burazin et al. |
| 2009/0167679 A1 | 7/2009 | Klier et al. |
| 2009/0167882 A1 | 7/2009 | Chen et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0183220 A1 | 7/2009 | Amento et al. |
| 2009/0195392 A1 | 8/2009 | Zalewski |
| 2009/0217315 A1 | 8/2009 | Malik et al. |
| 2009/0221368 A1 | 9/2009 | Yen et al. |
| 2009/0234718 A1 | 9/2009 | Green |
| 2009/0235195 A1 | 9/2009 | Shin et al. |

(56) References Cited

U.S. PATENT DOCUMENTS

| | | |
|---|---|---|
| 2009/0251425 A1 | 10/2009 | Sohn et al. |
| 2009/0252423 A1 | 10/2009 | Zhu et al. |
| 2009/0259960 A1 | 10/2009 | Steinle et al. |
| 2009/0296002 A1 | 12/2009 | Lida et al. |
| 2009/0303231 A1 | 12/2009 | Robinet et al. |
| 2009/0320055 A1 | 12/2009 | Langille et al. |
| 2009/0327977 A1 | 12/2009 | Bachfischer et al. |
| 2010/0005492 A1 | 1/2010 | Takano et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0070913 A1 | 3/2010 | Murrett et al. |
| 2010/0070987 A1 | 3/2010 | Amento et al. |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0095332 A1 | 4/2010 | Gran et al. |
| 2010/0107184 A1 | 4/2010 | Shintani |
| 2010/0122286 A1 | 5/2010 | Begeja et al. |
| 2010/0138780 A1 | 6/2010 | Marano et al. |
| 2010/0138797 A1 | 6/2010 | Thorn |
| 2010/0138798 A1 | 6/2010 | Wilson et al. |
| 2010/0146389 A1 | 6/2010 | Yoo et al. |
| 2010/0151946 A1 | 6/2010 | Wilson et al. |
| 2010/0153856 A1 | 6/2010 | Russ |
| 2010/0153984 A1 | 6/2010 | Neufeld |
| 2010/0169157 A1 | 7/2010 | Muhonen et al. |
| 2010/0169905 A1 | 7/2010 | Fukuchi et al. |
| 2010/0191631 A1 | 7/2010 | Weidmann |
| 2010/0207874 A1 | 8/2010 | Yuxin et al. |
| 2010/0207875 A1 | 8/2010 | Yeh |
| 2010/0211439 A1 | 8/2010 | Marci et al. |
| 2010/0235667 A1 | 9/2010 | Mucignat et al. |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0271802 A1 | 10/2010 | Recker et al. |
| 2010/0278393 A1 | 11/2010 | Snook et al. |
| 2010/0286983 A1 | 11/2010 | Cho |
| 2010/0295782 A1 | 11/2010 | Binder |
| 2010/0295783 A1 | 11/2010 | El Dokor et al. |
| 2010/0306712 A1 | 12/2010 | Snook |
| 2010/0327766 A1 | 12/2010 | Recker et al. |
| 2010/0332842 A1 | 12/2010 | Kaloboukis et al. |
| 2010/0333137 A1 | 12/2010 | Hamano et al. |
| 2011/0007142 A1 | 1/2011 | Perez et al. |
| 2011/0016102 A1 | 1/2011 | Hawthorne et al. |
| 2011/0026765 A1 | 2/2011 | Ivanich et al. |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0084983 A1 | 4/2011 | Demaine |
| 2011/0085705 A1 | 4/2011 | Izadi et al. |
| 2011/0115887 A1 | 5/2011 | Yoo et al. |
| 2011/0126154 A1 | 5/2011 | Boehler et al. |
| 2011/0145040 A1 | 6/2011 | Zahn et al. |
| 2011/0145041 A1 | 6/2011 | Salamatov et al. |
| 2011/0157009 A1 | 6/2011 | Kim et al. |
| 2011/0161912 A1 | 6/2011 | Eteminan et al. |
| 2011/0164143 A1 | 7/2011 | Shintani et al. |
| 2011/0173589 A1 | 7/2011 | Guttman et al. |
| 2011/0208582 A1 | 8/2011 | Hoyle |
| 2011/0214141 A1 | 9/2011 | Oyaizu |
| 2011/0216059 A1 | 9/2011 | Espiritu et al. |
| 2011/0242305 A1 | 10/2011 | Peterson et al. |
| 2011/0246572 A1 | 10/2011 | Kollenkark et al. |
| 2011/0254859 A1 | 10/2011 | Matsuda |
| 2011/0263946 A1 | 10/2011 | El Kaliouby et al. |
| 2011/0264531 A1 | 10/2011 | Bhatia et al. |
| 2011/0282745 A1 | 11/2011 | Meoded et al. |
| 2011/0316845 A1 | 12/2011 | Roberts et al. |
| 2011/0321096 A1 | 12/2011 | Landow et al. |
| 2012/0005632 A1 | 1/2012 | Broyles, III et al. |
| 2012/0011528 A1 | 1/2012 | Nielsen et al. |
| 2012/0011530 A1 | 1/2012 | Bentolila et al. |
| 2012/0030637 A1 | 2/2012 | Dey et al. |
| 2012/0047525 A1 | 2/2012 | Campagna et al. |
| 2012/0051719 A1 | 3/2012 | Marvit |
| 2012/0060176 A1 | 3/2012 | Chai et al. |
| 2012/0079521 A1 | 3/2012 | Garg et al. |
| 2012/0084812 A1 | 4/2012 | Thompson et al. |
| 2012/0105257 A1 | 5/2012 | Murillo et al. |
| 2012/0105473 A1 | 5/2012 | Bar-Zeev et al. |
| 2012/0109726 A1 | 5/2012 | Ruffini |
| 2012/0124603 A1 | 5/2012 | Amada |
| 2012/0192233 A1 | 7/2012 | Wong |
| 2012/0209715 A1 | 8/2012 | Lotan et al. |
| 2012/0226981 A1 | 9/2012 | Clavin |
| 2012/0249741 A1* | 10/2012 | Maciocci ............ G06F 3/011 348/46 |
| 2012/0268362 A1 | 10/2012 | Yee |
| 2012/0280897 A1 | 11/2012 | Balan et al. |
| 2012/0290508 A1 | 11/2012 | Bist |
| 2012/0304059 A1 | 11/2012 | McCloskey |
| 2012/0304206 A1 | 11/2012 | Roberts et al. |
| 2012/0306734 A1 | 12/2012 | Kim et al. |
| 2012/0324491 A1 | 12/2012 | Bathiche et al. |
| 2013/0007671 A1 | 1/2013 | Hammontree et al. |
| 2013/0014144 A1 | 1/2013 | Bhatia et al. |
| 2013/0054652 A1 | 2/2013 | Antonelli et al. |
| 2013/0117771 A1 | 5/2013 | Lee et al. |
| 2013/0136358 A1 | 5/2013 | Dedhia et al. |
| 2013/0145384 A1 | 6/2013 | Krum et al. |
| 2013/0145385 A1 | 6/2013 | Aghajanyan et al. |
| 2013/0152113 A1 | 6/2013 | Conrad et al. |
| 2013/0159555 A1 | 6/2013 | Rosser et al. |
| 2013/0198690 A1 | 8/2013 | Barsoum et al. |
| 2013/0226464 A1 | 8/2013 | Marci et al. |
| 2013/0232515 A1 | 9/2013 | Rivera et al. |
| 2013/0268954 A1 | 10/2013 | Hulten et al. |
| 2013/0268955 A1 | 10/2013 | Conrad et al. |
| 2013/0298146 A1 | 11/2013 | Conrad et al. |
| 2013/0298158 A1 | 11/2013 | Conrad et al. |
| 2014/0109121 A1 | 4/2014 | Krum et al. |
| 2015/0062120 A1* | 3/2015 | Reisner-Kollmann ........ G06T 7/0042 345/419 |
| 2015/0128161 A1 | 5/2015 | Conrad et al. |
| 2015/0262412 A1* | 9/2015 | Gruber ............ G06T 19/006 345/426 |
| 2015/0302645 A1* | 10/2015 | Takeuchi ........ G01C 21/3602 345/633 |
| 2015/0356774 A1* | 12/2015 | Gal ............... G06F 17/50 345/633 |

FOREIGN PATENT DOCUMENTS

| | | |
|---|---|---|
| CN | 101095055 A | 12/2007 |
| CN | 101202994 A | 6/2008 |
| CN | 101254344 A | 9/2008 |
| CN | 102713788 A | 10/2012 |
| EP | 0583061 A2 | 2/1994 |
| EP | 1315375 A2 | 5/2003 |
| GB | 2423808 A | 9/2006 |
| GB | 2459707 A | 11/2009 |
| JP | H10844490 A | 2/1996 |
| WO | 9310708 A1 | 6/1993 |
| WO | 9717598 A1 | 5/1997 |
| WO | 9915863 A1 | 4/1999 |
| WO | 9944698 A2 | 9/1999 |
| WO | 0159975 A2 | 8/2001 |
| WO | 0163916 A1 | 8/2001 |
| WO | 0169799 A2 | 9/2001 |
| WO | 02082249 A2 | 10/2002 |
| WO | 03001722 A2 | 1/2003 |
| WO | 03015056 A2 | 2/2003 |
| WO | 03046706 A1 | 6/2003 |
| WO | 03054683 A2 | 7/2003 |

(56) References Cited

FOREIGN PATENT DOCUMENTS

| WO | 03071410 | A2 | 8/2003 |
|---|---|---|---|
| WO | 03073359 | A2 | 9/2003 |
| WO | 2007128057 | A1 | 11/2007 |
| WO | 2008001287 | A2 | 1/2008 |
| WO | 2009059065 | A1 | 5/2009 |
| WO | 2011069035 | A1 | 6/2011 |

OTHER PUBLICATIONS

Guler, Sadiye, "Split and Merge Behavior Analysis and Understanding Using Hidden Markov Models," U.S. Appl. No. 60/416,553, filed Oct. 8, 2002, 21 pages.
Clavin, John et al., "Controlling Power Levels of Electronic Devices Through User Interaction," U.S. Appl. No. 12/794,406, filed Jun. 4, 2010, 37 pages.
Lotan, Gilad et al., "Interaction With Networked Screen Content Via Motion Sensing Device in Retail Setting," U.S. Appl. No. 13/025,180, filed Feb. 11, 2011, 23 pages.
Clavin, John, "Controlling Electronic Devices in a Multimedia System Through a Natural User Interface," U.S. Appl. No. 13/039,024, filed Mar. 2, 2011, 46 pages.
"Response to Office Action Submitted in U.S. Appl. No. 12/794,407," dated Feb. 14, 2013, 12 pages.
"Response to Final Office Action Submitted in U.S. Appl. No. 12/794,406," dated Jul. 22, 2013, 9 pages.
ISA Korean Intellectual Property Office, International Search Report Issued in Application No. PCT/US2010/036005, dated Dec. 24, 2010, WIPO, 3 pages.
Canadian Intellectual Property Office, Office Action Issued in Canadian Patent Application No. 2,775,700, dated Aug. 24, 2012, 2 pages.
Canadian Intellectual Property Office, Office Action Issued in Canadian Patent Application No. 2,775,814, dated Aug. 24, 2012, 3 pages.
ISA Korean Intellectual Property Office, International Search Report and Written Opinion Issued in Application No. PCT/US2012/034641, dated Nov. 30, 2012, WIPO, 9 pages.
Canadian Intellectual Property Office, Office Action Issued in Canadian Patent Application No. 2,775,814, dated Dec. 14, 2012, 3 pages.
Canadian Intellectual Property Office, Notice of Allowance Issued in Canadian Patent Application No. 2,775,700, dated Jan. 3, 2013, 1 page.
European Patent Office, European Search Report Issued in Application No. 12194891.3, dated Apr. 4, 2013, Germany, 3 pages.
European Patent Office, European Search Report Issued in Application No. 12195349.1, dated Apr. 22, 2013, Germany, 3 pages.
European Patent Office, Office Action Issued in European Patent Application No. 12194891.3, dated Apr. 24, 2013, Germany, 5 pages.
European Patent Office, Office Action Issued in European Patent Application No. 12195349.1, dated May 10, 2013, Germany, 5 pages.
ISA European Patent Office, International Search Report and Written Opinion Issued in Application No. PCT/US2013/035047, dated Jul. 5, 2013, WIPO, 10 pages.
State Intellectual Property Office of the People's Republic of China, Office Action Issued in Application No. 201110159923.8, dated Sep. 2, 2013, 13 pages.
ISA European Patent Office, International Search Report and Written Opinion Issued in Application No. PCT/US2013/035348, dated Sep. 25, 2013, WIPO, 16 pages.
ISA European Patent Office, International Search Report and Written Opinion Issued in Application No. PCT/US2013/038710, dated Jan. 8, 2014, WIPO, 18 pages.
State Intellectual Property Office of the People's Republic of China, Office Action Issued in Application No. 201110159923.8, dated May 22, 2014, 10 pages.
ISA Korean Intellectual Property Office, International Search Report and Written Opinion Issued in Application No. PCT/US2013/039591, dated Aug. 1, 2014, WIPO, 10 pages.
European Patent Office, Summons to Attend Oral Proceedings Issued in Application No. 12194891.3, dated Sep. 17, 2014, Germany, 7 pages.
European Patent Office, Summons to Attend Oral Proceedings Issued in Application No. 12195349.1, dated Sep. 17, 2014, Germany, 7 pages.
State Intellectual Property Office of the People's Republic of China, Notice of Allowance Issued in Application No. 201110159923.8, dated Dec. 2, 2014, 4 pages.
European Patent Office, Extended European Search Report Issued in Application No. 13724078.4, dated May 13, 2015, Germany, 7 pages.
European Patent Office, Communication Pursuant to Rules 70(2) and 70a(2) EPC Issued in Application No. 13724078.4, dated Jun. 1, 2015, Germany, 1 page.
Oh, A. et al., "Evaluating Look-to-Talk: A Gaze-Aware Interface in a Collaborative Environment," CHI '02 Extended Abstracts on Human Factors in Computing Systems (CHI EA '02), Apr. 20, 2002, Minneapolis, Minnesota, 2 pages.
Fitzgerald, W. et al., "Multimodal Event Parsing for Intelligent User Interfaces," Proceedings of the 8th International Conference on Intelligent User Interfaces (IUI '03), Jan. 12, 2003, Miami, Florida, 8 pages.
Nielsen, M. et al., "A Procedure for Developing Intuitive and Ergonomic Gesture Interfaces for Man-Machine Interaction," Technical Report CVMT 03-01, Aalborg University, Mar. 2003, 12 pages.
Guyon, I. et al., "An Introduction to Variable and Feature Selection," Journal of Machine Learning Research, vol. 3, Mar. 1, 2003, 26 pages.
Dalton, A. et al., "Sensing User Intention and Context for Energy Management," Proceedings of the 9th Conference on Hot Topics in Operating Systems (HOTOS'03), May 18, 2003, Lihue, Hawaii, 5 pages.
Wilson, A. et al., "GWindows: Towards Robust Perception-Based UI," Proceedings of CVPR 2003 (Workshop on Computer Vision for HCI), Jun. 16, 2003, Madison, Wisconsin, 8 pages.
Sharma, R. et al., "Speech-Gesture Driven Multimodal Interfaces for Crisis Management," Proceedings of the IEEE, vol. 91, No. 9, Sep. 2003, 28 pages.
Boverie, S. et al., "Comparison of structured light and stereovision sensors for new airbag generations," Control Engineering Practice, vol. 11, No. 12, Dec. 2003, Published Online Oct. 3, 2003, 9 pages.
Viola, P. et al., "Robust Real-Time Face Detection," International Journal of Computer Vision, vol. 57, No. 2, May 1, 2004, 18 pages.
El Kaliouby, R. et al., "Real-Time Inference of Complex Mental States from Facial Expressions and Head Gestures," Proceedings of the 2004 Conference on Computer Vision and Pattern Recognition Workshop (CVPRW'04), vol. 10, Jun. 27, 2004, Washington, D.C., 20 pages.
Qian, G. et al., "A Gesture-Driven Multimodal Interactive Dance System," 2004 IEEE International Conference on Multimedia and Expo (ICME 04), Jun. 27, 2004, Taipei, Taiwan, 4 pages.
Kolsch, M. et al., "Vision-Based Interfaces for Mobility," Proceedings of the First Annual International Conference on Mobile and Ubiquitous Systems:Networking and Services (MobiQuitous'04), Aug. 22, 2004, Boston, Massachusetts, 9 pages.
Bowman, D. et al., "New Directions in 3D User Interfaces," The International Journal of Virtual Reality, vol. 5, No. 2, Mar. 12, 2005, 12 pages.
He, L., "Generation of Human Body Models," Master's Thesis, University of Auckland, Apr. 2005, 111 pages.
Kwon, D. et al., "Combining Body Sensors and Visual Sensors for Motion Training," Proceedings of the 2005 ACM SIGCHI International Conference on Advances in Computer Entertainment Technology (ACE '05), Jun. 15, 2005, Valencia, Spain, 8 pages.
"GWindows: Light-weight Stereo Vision for Interaction," Available Online at http://www.nuriaoliver.com/gwindows/, As Retrieved Jul. 7, 2005, 2 pages.
Martin, B., "VirHKey: a VIRtual Hyperbolic KEYboard with gesture interaction and visual feedback for mobile devices," Proceed-

(56) References Cited

OTHER PUBLICATIONS ings of the 7th International Conference on Human Computer Interaction with Mobile Devices & Services (MobileHCI '05), Sep. 19, 2005, Salzburg, Austria, 8 pages.

Latoschik, M., "A User Interface Framework for Multimodal VR Interactions," Proceedings of the 7th International Conference on Multimodal Interfaces (ICMI '05), Oct. 4, 2005, Trento, Italy, 8 pages.

Morency, L. et al., "Contextual Recognition of Head Gestures," Proceedings of the 7th International Conference on Multimodal Interfaces (ICMI '05), Oct. 4, 2005, Trento, Italy, 7 pages.

Kapoor, A. et al., "Multimodal Affect Recognition in Learning Environments," Proceedings of the 13th Annual ACM International Conference on Multimedia (Multimedia '05), Nov. 6, 2005, Singapore, 6 pages.

Paquit, V. et al., "Near-infrared imaging and structured light ranging for automatic catheter insertion," Proceedings of Medical Imaging 2006: Visualization, Image-Guided Procedures, and Display, SPIE vol. 6141, Feb. 11, 2006, San Diego, California, 9 pages.

Poels, K. et al., "How to capture the heart? Reviewing 20 years of emotion measuring in advertising," KUL Working Paper No. MO 0605, Katholieke Universiteit Leuven, Apr. 2006, 48 pages.

Ba, S. et al., "Head pose tracking and focus of attention recognition algorithms in meeting rooms," Proceedings of the 1st International Evaluation Conference on Classification of Events, Activities and Relationships (CLEAR'06), Apr. 6, 2006, Southampton, United Kingdom, 12 pages.

Zhang, Z. et al., "Head Pose Estimation in Seminar Room using Multi View Face Detectors," Proceedings of the 1st International Evaluation Conference on Classification of Events, Activities and Relationships (CLEAR'06), Apr. 6, 2006, Southampton, United Kingdom, 7 pages.

Li, S. et al., "A Near-infrared Image Based Face Recognition System," Proceedings of the 7th International Conference on Automatic Face and Gesture Recognition (FGR '06), Apr. 10, 2006, Southampton, United Kingdom, 6 pages.

Moscovich, T., "Multi-touch Interaction," CHI '06 Extended Abstracts on Human Factors in Computing Systems (CHI EA '06), Apr. 22, 2006, Montreal, Quebec, 4 pages.

Argyros, A. et al., "Vision-Based Interpretation of Hand Gestures for Remote Control of a Computer Mouse," Proceedings of the 2006 International Conference on Computer Vision in Human-Computer Interaction (ECCV'06), May 13, 2006, Graz, Austria, 12 pages.

Op Den Akker, R. et al., "Supporting Engagement and Floor Control in Hybrid Meetings," Cross-Modal Analysis of Speech, Gestures, Gaze and Facial Expressions, A. Esposito, ed., Springer-Verlag Berlin Heidelberg, Oct. 15, 2008, 15 pages.

"Designing CEC into your next HDMI Product," Quantum Date White Paper, Available Online at www.quantumdata.com/pdf/CEC_White_Paper.pdf, May 13, 2006, 12 pages.

Hasegawa, S. et al., "Human-Scale Haptic Interaction with a Reactive Virtual Human in a Real-Time Physics Simulator," ACM Computers in Entertainment, vol. 4, No. 3, Article 6C, Jul. 2006, 12 pages.

Maltby, J., "Using Perspective in 3D File Management: Rotating Windows and Billboarded Icons," Proceedings of the 2006 International Conference on Computer Graphics, Imaging and Visualisation (CGIV'06), Jul. 26, 2006, Sydney, Australia, 8 pages.

Tresadern, P., "Visual Analysis of Articulated Motion," Doctoral Thesis, University of Oxford, Oct. 12, 2006, 171 pages.

Fitzgerald, D. et al., "Integration of kinematic Analysis into Computer Games for Exercise," Proceedings of the 9th International Conference on Computer Games: AI, Animation, Mobile, Educational and Serious Games (CGAMES 2006), Nov. 22, 2006, Dublin, Ireland, 5 pages.

Raymer, A., "Gestures and Words: Facilitating Recovery in Aphasia," The ASHA Leader, vol. 12, Jun. 19, 2007, 6 pages.

Klompmaker, F., "D5.1—State of the art analysis and recommendations on 'Context Awareness', 'Human Computer Interaction' and 'Mobile User Interfaces'," ITEA Project 04012, Jul. 2, 2007, 55 pages.

Wood, O., "Using Faces: Measuring Emotional Engagement for Early Stage Creative," ESOMAR Congress 2007, Sep. 19, 2007, Berlin, Germany, 29 pages.

Agarwal, A. et al., "High Precision Multi-touch Sensing on Surfaces using Overhead Cameras," Proceedings of the Second Annual IEEE International Workshop on Horizontal Interactive Human-Computer Systems (TABLETOP '07), Oct. 10, 2007, Newport, Rhode Island, 4 pages.

Kim, S. et al., "Multi-touch tabletop interface technique for HCI," Available Online at http://citeseerx.ist.psu.edu/viewdoc/download?doi=10.1.1.116.5950&rep=rep1&type=pdf, Available as Early as Jan. 1, 2008, 4 pages.

Gonzalez, G., "HDMI CEC," Sound and Vision Website, Available Online at http://www.soundandvision.com/content/hdmi-cec#fBFVJUptuhXxSyCg.97, Mar. 24, 2008, 3 pages.

Tep, S. et al., "Web site quality evaluation combining eyetracking and physiological measures to self-reported emotions: an exploratory research," Proceedings of Measuring Behavior 2008, Aug. 26, 2008, Maastricht, Netherlands, 2 pages.

Shivappa, S. et al., "Person Tracking With Audio-visual Cues Using the Iterative Decoding Framework," Proceedings of the IEEE Fifth International Conference on Advanced Video and Signal Based Surveillance (AVSS 2008), Sep. 1, 2008, Santa Fe, New Mexico, 8 pages.

Rosenhahn, B. et al., "Automatic Human Model Generation," Proceedings of the 11th International Conference of CAIP, Sep. 5, 2005, Versailles, France, 8 pages.

Vaucelle, C. et al., "Picture This! Film assembly using toy gestures," Proceedings of the 10th International Conference on Ubiquitous Computing (UbiComp '08), Sep. 21, 2008, Seoul, South Korea, 10 pages.

Liang, L. et al., "Face Alignment via Component-based Discriminative Search," Proceedings of the 10th European Conference on Computer Vision (ECCV08), Oct. 12, 2008, Marseille, France, 14 pages.

Minge, M., "Dynamics of User Experience," Proceedings of the Workshop on Research Goals and Strategies for Studying User Experience and Emotion (NordiCHI '08), Oct. 20, 2008, Lund, Sweden, 5 pages.

Voit, M. et al., "Deducing the Visual Focus of Attention from Head Pose Estimation in Dynamic Multi-View Meeting Scenarios," Proceedings of the 10th International Conference on Multimodal Interfaces (ICMI '08), Oct. 20, 2008, ahania, Crete, 8 pages.

Shen, G. et al., "Dita: Enabling Gesture-based Human-Device Interaction using Mobile Phone," Available Online at http://citeseerx.ist.psu.edu/viewdock/download?doi=10.1.1.186.7191&rep=rep1&type=pdf, Available as Early as Jan. 1, 2009, 14 pages.

Ba, S. et al., "Recognizing Visual Focus of Attention from Head Pose in Natural Meetings," IEEE Transactions on Systems, Man, and Cybernetics, Part B (Cybernetics), vol. 39, No. 1, Feb. 2009, 36 pages.

Asteriadis, S. et al., "Estimation of behavioral user state based on eye gaze and head pose—application in an e-learning environment," Multimedia Tools and Applications, vol. 41, No. 3, Feb. 1, 2009, 25 pages.

"Signal Processing Institute Semester / Diploma projects proposals," Retrieved Online at http://ltswww.epfl.ch/~alahi/student_projects/proposals.shtml, Retrieved Feb. 6, 2009, 4 pages.

Tilley, S., "Load This—E3 09: Project Natal exposed," Load This Blog Website, Retrieved Online from http://blogs.canoe.ca/loadthis/general/e3-09-project-natal-exposed/, Jun. 1, 2009, 4 pages.

Leal, A. et al., "Initial Explorations into the User Experience of 3D File Browsing," Proceedings of the 23rd British HCI Group Annual Conference on People and Computers: Celebrating People and Technology (BCS-HCI '09), Sep. 1, 2009, Cambridge, United Kingdom, 6 pages.

Todd, P., "Adwords Agency Blog: Google Campaign Insights: Better measurement for display advertising," Adwords Agency

(56) References Cited

OTHER PUBLICATIONS

Website, Available Online at https://adwords.googleblog.com/2009/10/campaign-insights-better-measurement.html, Oct. 19, 2009, 3 pages.
Schick, A. et al., "Extending Touch: Towards Interaction with Large-Scale Surfaces," Proceedings of the ACM International Conference on Interactive Tabletops and Surfaces (ITS '09), Nov. 23, 2009, Banff, Alberta, 8 pages.
Bhuiyan, M. et al., "Gesture-controlled user interfaces, what have we done and what's next?," Proceedings of the Fifth Collaborative Research Symposium on Security, E-learning, Internet and Networking (SEIN 2009), Nov. 25, 2009, Darmstadt, Germany, 10 pages.
Le, N., "EmuPlayer: Music Recommendation System Based on User Emotion Using Vital-sensor," Bachelor's Thesis, Keio University, Available as Early as Jan. 1, 2010, 85 pages.
Freed, N., "Toys Keeping in Touch: Technologies for Distance Play," Proceedings of the 4th International Conference on Tangible and Embedded Interaction (TEI 2010), Jan. 24, 2010, Cambridge, Massachusetts, 2 pages.
"Future Media Internet Research Challenges and the Road Ahead," European Commission Information Society and Media White Paper, Available Online at http://www.future-internet.eu/uploads/media/FMI-TF-White_paper_042010_01.pdf, Apr. 2010, 31 pages.
McCrae, J. et al., "Exploring the Design Space of Multiscale 3D Orientation," Proceedings of the International Conference on Advanced Visual Interfaces (AVI '10), May 25, 2010, Rome, Italy, 8 pages.
Grundner, A., "Updated: Xbox 360 Kinect Hand Gesture Media Controls, Voice Control, TV Video Chat," eHomeUpgrade Website, Available Online at http://www.ehomeupgrade.com/2010/06/14/updated-xbox-360-kinect-hand-gesture-media-controls-voice-control-tv-video-chat/, Jun. 14, 2010, 8 pages.
Jacko, "HDI Dune Prime 3.0 Part 2," Jacko.MY Website, Available Online at http://www.jacko.my/2010/06/hdi-dune-prime-30-part-2.html, Jun. 19, 2010, 15 pages.
Parrish, K., "Microsoft Does Want Core Games, FPS for Kinect," Tom's Guide Website, Available Online at http://www.tomsguide.com/us/Core-Gamers-Kinect-FPS-Action,news-7195.html, Jun. 23, 2010, 1 page.
Simeone, L. et al., "Toys++ AR embodied agents as tools to learn by building," Proceedings of the IEEE 10th International Conference on Advanced Learning Technologies (ICALT 2010), Jul. 5, 2010, Sousse, Tunisia, 2 pages.
Crawford, S., "How Microsoft Kinect Works," How Stuff Works Website, Available Online at http://electronics.howstuffworks.com/microsoft-kinect.htm, Available as Early as Jul. 25, 2010, Retrieved Aug. 19, 2010, 5 pages.
Sarkar, S., "Kinect is your personal trainer in EA Sports Active 2," Destructoid Website, Available Online at https://www.destructoid.com/kinect-is-your-personal-trainer-in-ea-sports-active-2-179921.phtml, Jul. 26, 2010, 4 pages.
"The Case for Kinect," Eurogamer Website, Available Online at http://www.eurogamer.net/articles/digitalfoundry-the-aase-for-kinect-article, Aug. 7, 2010, 6 pages.
Millan, M. et al., "Unsupervised defect segmentation of patterned materials under NIR illumination," Journal of Physics: Conference Series, vol. 274, No. 1, Sep. 20, 2010, 9 pages.
"Affdex: Measuring emotion over the web," Affectiva Website, Retrieved Online at http://www.affectiva.com/affdex/, Available as Early as Oct. 24, 2010, Retrieved Nov. 4, 2011, 3 pages.
Schiesel, S., "A Home System Leaved Hand Controls in the Dust," New York Times Website, Available Online at http://www.nytimes.com/2010/11/04/arts/television/04kinect.html, Nov. 4, 2010, 3 pages.
Hardin, W., "Machine Vision Makes the Leap to Consumer Gaming," Machine Vision Online Website, Available Online at http://www.visiononline.org/vision-resources-details.cfm/vision-resources/Machine-Vision-Makes-the-Leap-to-Consumer-Gaming/content_id/2398, Dec. 8, 2010, 3 pages.
"KinEmote uses Kinect to translate key strokes for Windows applications," Tech Shout Website, Available Online at http://www.techshout.com/gaming/2010/28/kinemote-uses-kinect-to-translate-key-strokes-for-windows-applications/, Dec. 28, 2010, 2 pages.
Yakut, I. et al., "User and Task Analysis of Multi-Level 3D File Browser," Department of Computer Engineering Bilkent University, Available Online at http://www.cs.bilkent.edu.tr/~cansin/projects/cs560-3dui/multi-level-3d-file-browser/3dui-report.pdf, Available as Early as Jan. 1, 2011, 4 pages.
Morrison, G., "A Camera-Based Touch Interface for Pervasive Displays," Smart Technologies Inc., Available Online at http://ubicomp.algoritmi.uminho.pt/perdisplay/docs/Morrison-Camera%20Touch_SV_Rev1.pdf, Retrieved Mar. 16, 2011, 7 pages.
"Commanding Overview: .NET Framework 4," Microsoft Developer Network Website, Retrieved Online from https://msdn.microsoft.com/en-us/library/ms752308(d=printer).aspx, As Retrieved Sep. 27, 2011, 11 pages.
Peacock, J. et al., "Which Broadcast Medium Better Drives Engagement? Measuring the Powers of Radio and Television with Electromyography and Skin-Conductance Measurements," Journal of Advertising Research, vol. 51, No. 4, Dec. 1, 2011, 8 pages.
McDuff, D. et al., "AffectAura: An Intelligent System for Emotional Memory," Proceedings of the 2012 ACM SIGCHI Conference on Human Factors in Computing Systems (CHI 2012), May 5, 2012, Austin, Texas, 10 pages.
McDuff, D., "Affective Storytelling: Automatic Measurement of Story Effectiveness from Emotional Responses collected over the Internet," PhD Proposal in Media Arts & Sciences, Affective Computing Group, MIT Media Lab, Jun. 6, 2012, 16 pages.
McDuff, D. et al., "Crowdsourcing Facial Responses to Online Videos," IEEE Transactions on Affective Computing, vol. 3, No. 4, Oct. 2012, Published Online Jun. 14, 2012, 13 pages.
Chang, C., "LIVSVM—A Library for Support Vector Machines," Retrieved Online from https://www.csie.ntu.edu.tw/~cjlin/libsvm/, As Retrieved Apr. 1, 2013, 4 pages.
"Definition of 'Subscribe'," Dictionary.com Website, Retrieved Online from http://www.dictionary.com/browse/subscribe?s=t, As Retrieved Jan. 7, 2015, 5 pages.
"Definition of 'Synchronize'," Dictionary.com Website, Retrieved Online from http://www.dictionary.com/browse/synchronize?s=t, As Retrieved Jan. 7, 2015, 4 pages.
United States Patent and Trademark Office, Office Action Issued in U.S. Appl. No. 13/411,859, dated Mar. 11, 2014, 13 pages.
United States Patent and Trademark Office, Office Action Issued in U.S. Appl. No. 13/025,180, dated Mar. 14, 2014, 21 pages.
United States Patent and Trademark Office, Office Action Issued in U.S. Appl. No. 13/488,046, dated Mar. 14, 2014, 11 pages.
United States Patent and Trademark Office, Office Action Issued in U.S. Appl. No. 13/039,024, dated Apr. 7, 2014, 12 pages.
United States Patent and Trademark Office, Office Action Issued in U.S. Appl. No. 13/488,046, dated May 1, 2014, 12 pages.
United States Patent and Trademark Office, Office Action Issued in U.S. Appl. No. 12/794,406, Jun. 4, 2014, 14 pages.
United States Patent and Trademark Office, Office Action Issued in U.S. Appl. No. 13/316,351, dated Jun. 19, 2014, 23 pages.
United States Patent and Trademark Office, Office Action Issued in U.S. Appl. No. 13/331,886, dated Jun. 19, 2014, 18 pages.
United States Patent and Trademark Office, Advisory Action Issued in U.S. Appl. No. 13/025,180, dated Jul. 3, 2014, 3 pages.
United States Patent and Trademark Office, Notice of Allowance Issued in U.S. Appl. No. 13/439,284, dated Jul. 21, 2014, 3 pages.
United States Patent and Trademark Office, Office Action Issued in U.S. Appl. No. 13/488,046, dated Jul. 23, 2014, 12 pages.
United States Patent and Trademark Office, Office Action Issued in U.S. Appl. No. 13/411,859, dated Aug. 8, 2014, 16 pages.
United States Patent and Trademark Office, Office Action Issued in U.S. Appl. No. 14/108,008, dated Aug. 14, 2014, 16 pages.
United States Patent and Trademark Office, Office Action Issued in U.S. Appl. No. 13/363,689, dated Sep. 15, 2014, 21 pages.
United States Patent and Trademark Office, Notice of Allowance Issued in U.S. Appl. No. 13/866,699, dated Sep. 17, 2014, 6 pages.
United States Patent and Trademark Office, Notice of Allowance Issued in U.S. Appl. No. 13/482,867, dated Sep. 30, 2014, 17 pages.
United States Patent and Trademark Office, Office Action Issued in U.S. Appl. No. 13/441,228, dated Oct. 2, 2014, 18 pages.

(56) References Cited

OTHER PUBLICATIONS

United States Patent and Trademark Office, Office Action Issued in U.S. Appl. No. 13/114,359, dated Oct. 20, 2014, 7 pages.
United States Patent and Trademark Office, Office Action Issued in U.S. Appl. No. 13/411,859, dated Nov. 5, 2014, 16 pages.
United States Patent and Trademark Office, Office Action Issued in U.S. Appl. No. 13/316,351, dated Nov. 14, 2014, 23 pages.
United States Patent and Trademark Office, Office Action Issued in U.S. Appl. No. 13/039,024, dated Dec. 3, 2014, 14 pages.
United States Patent and Trademark Office, Office Action Issued in U.S. Appl. No. 13/331,886, dated Jan. 7, 2015, 19 pages.
United States Patent and Trademark Office, Office Action Issued in U.S. Appl. No. 13/025,180, dated Jan. 15, 2015, 17 pages.
United States Patent and Trademark Office, Notice of Allowance Issued in U.S. Appl. No. 12/794,406, dated Jan. 21, 2015, 11 pages.
United States Patent and Trademark Office, Office Action Issued in U.S. Appl. No. 13/488,046, dated Jan. 27, 2015, 13 pages.
United States Patent and Trademark Office, Office Action Issued in U.S. Appl. No. 14/108,008, dated Feb. 3, 2015, 9 pages.
United States Patent and Trademark Office, Office Action Issued in U.S. Appl. No. 13/114,359, dated Mar. 23, 2015, 12 pages.
United States Patent and Trademark Office, Notice of Allowance Issued in U.S. Appl. No. 13/316,351, dated Mar. 25, 2015, 6 pages.
United States Patent and Trademark Office, Office Action Issued in U.S. Appl. No. 13/025,180, dated Apr. 24, 2015, 18 pages.
United States Patent and Trademark Office, Office Action Issued in U.S. Appl. No. 13/363,689, dated Apr. 24, 2015, 24 pages.
United States Patent and Trademark Office, Notice of Allowance Issued in U.S. Appl. No. 14/108,008, dated May 11, 2015, 3 pages.
United States Patent and Trademark Office, Office Action Issued in U.S. Appl. No. 13/441,228, dated May 21, 2015, 21 pages.
United States Patent and Trademark Office, Office Action Issued in U.S. Appl. No. 13/411,859, dated Jun. 3, 2015, 17 pages.
United States Patent and Trademark Office, Office Action Issued in U.S. Appl. No. 13/039,024, dated Jul. 1, 2015, 18 pages.
United States Patent and Trademark Office, Office Action Issued in U.S. Appl. No. 13/331,886, dated Jul. 6, 2015, 20 pages.
United States Patent and Trademark Office, Corrected Notice of Allowance Issued in U.S. Appl. No. 13/316,351, dated Jul. 1, 2015, 2 pages.
United States Patent and Trademark Office, Office Action Issued in U.S. Appl. No. 14/280,140, dated Aug. 19, 2015, 8 pages.
United States Patent and Trademark Office, Notice of Allowance Issued in U.S. Appl. No. 14/280,140, dated Feb. 25, 2016, 8 pages.
Welford, A., "Signal, Noise, Performance, and Age," Human Factors: The Journal of the Human Factors and Ergonomics Society, vol. 23, No. 1, Feb. 1981, 15 pages.
Buxton, W. et al., "A Study in Two-Handed Input," Proceedings of the SIGCHI Conference on Human Factors in Computing Systems (CHI '86 ), Apr. 13, 1986, Boston, Massachusetts, 6 pages.
Fisher, S. et al., "Virtual Environment Display System," Proceedings of the ACM 1986 Workshop on Interactive 3D Graphics, Oct. 23, 1986, Chapel Hill, North Carolina, 12 pages.
Guiard, Y., "Asymetric Division of Labor in Human Skilled Bimanual Action: The Kinematic Chain as a Model," Journal of Motor Behaviour, vol. 19, No. 4, Dec. 1987, 24 pages.
Boser, B. et al., "A Training Algorithm for Optimal Margin Classifiers," Proceedings of the Fifth Annual Workshop on Computational Learning Theory (COLT '92), Jul. 27, 1992, Pittsburgh, Pennsylvania, 9 pages.
Mignot, C. et al., "An Experimental Study of Future 'Natural' Multimodal Human-Computer Interaction," Proceedings of Interact '93 and CHI '93 Conference Companion on Human Factors in Computing Systems, Apr. 24, 1993, Amsterdam, Netherlands, 2 pages.
Azarbayejani, A. et al., "Visually Controlled Graphics," IEEE Transactions on Pattern Analysis and Machine Intelligence, vol. 15, No. 6, Jun. 1993, 4 pages.
Baudel, T. et al., "CHARADE: Remote Control of Objects using Free-Hand Gestures," Communications of the ACM—Special Issue on Computer Augmented Environments: Back to the Real World, vol. 36, No. 7, Jul. 1993, 10 pages.
"Simulation and Training," Division Incorporated, Available as Early as Jan. 1, 1994, 6 pages.
Zhai, S. et al., "The 'Silk Cursor': Investigating Transparency for 3D Target Acquisition," Proceedings of the SIGCHI Conference on Human Factors in Computing Systems (CHI '94), Apr. 24, 1994, Boston, Massachusetts, 7 pages.
Stevens, J., "Flights Into Virtual Reality Treating Real World Disorders," The Washington Post, Science Psychology, Mar. 27, 1995, 2 pages.
"Virtual High Anxiety," Popular Mechanics, vol. 172, No. 8, Aug. 1995, 1 page.
United States Patent and Trademark Office, Office Action Issued in U.S. Appl. No. 10/396,653, dated Sep. 19, 2006, 24 pages.
United States Patent and Trademark Office, Office Action Issued in U.S. Appl. No. 10/396,653, dated Feb. 26, 2007, 18 pages.
United States Patent and Trademark Office, Advisory Action Issued in U.S. Appl. No. 10/396,653, dated May 2, 2007, 3 pages.
United States Patent and Trademark Office, Office Action Issued in U.S. Appl. No. 10/396,653, dated Sep. 6, 2007, 17 pages.
United States Patent and Trademark Office, Office Action Issued in U.S. Appl. No. 10/396,653, dated Feb. 25, 2008, 20 pages.
United States Patent and Trademark Office, Advisory Action Issued in U.S. Appl. No. 10/396,653, dated May 23, 2008, 3 pages.
United States Patent and Trademark Office, Office Action Issued in U.S. Appl. No. 10/396,653, dated Sep. 8, 2008, 13 pages.
United States Patent and Trademark Office, Office Action Issued in U.S. Appl. No. 11/626,794, dated Dec. 23, 2008, 18 pages.
United States Patent and Trademark Office, Office Action Issued in U.S. Appl. No. 10/396,653, dated Feb. 20, 2009, 12 pages.
United States Patent and Trademark Office, Office Action Issued in U.S. Appl. No. 11/626,794, dated Jun. 11, 2009, 14 pages.
United States Patent and Trademark Office, Office Action Issued in U.S. Appl. No. 11/626,794, dated Oct. 27, 2009, 15 pages.
United States Patent and Trademark Office, Notice of Allowance Issued in U.S. Appl. No. 10/396,653, dated Nov. 19, 2009, 7 pages.
United States Patent and Trademark Office, Notice of Allowance Issued in U.S. Appl. No. 11/626,794, dated May 13, 2010, 4 pages.
United States Patent and Trademark Office, Office Action Issued in U.S. Appl. No. 12/474,453, dated Sep. 6, 2011, 10 pages.
United States Patent and Trademark Office, Office Action Issued in U.S. Appl. No. 12/474,453, dated May 10, 2012, 14 pages.
United States Patent and Trademark Office, Office Action Issued in U.S. Appl. No. 12/794,406, dated Sep. 14, 2012, 17 pages.
United States Patent and Trademark Office, Notice of Allowance Issued in U.S. Appl. No. 12/474,453, dated Dec. 12, 2012, 8 pages.
United States Patent and Trademark Office, Office Action Issued in U.S. Appl. No. 13/309,859, dated Dec. 18, 2012, 10 pages.
United States Patent and Trademark Office, Office Action Issued in U.S. Appl. No. 13/316,351, dated Feb. 14, 2013, 16 pages.
United States Patent and Trademark Office, Office Action Issued in U.S. Appl. No. 13/439,284, dated Feb. 25, 2013, 31 pages.
United States Patent and Trademark Office, Office Action Issued in U.S. Appl. No. 13/441,228, dated Mar. 20, 2013, 12 pages.
United States Patent and Trademark Office, Office Action Issued in U.S. Appl. No. 13/025,180, dated Apr. 5, 2013, 17 pages.
United States Patent and Trademark Office, Office Action Issued in U.S. Appl. No. 12/794,406, dated Apr. 22, 2013, 14 pages.
United States Patent and Trademark Office, Restriction Requirement Issued in U.S. Appl. No. 13/488,046, dated May 2, 2013, 5 pages.
United States Patent and Trademark Office, Office Action Issued in U.S. Appl. No. 12/794,406, dated Sep. 6, 2013, 13 pages.
United States Patent and Trademark Office, Office Action Issued in U.S. Appl. No. 13/309,859, dated May 15, 2013, 13 pages.
United States Patent and Trademark Office, Office Action Issued in U.S. Appl. No. 13/439,284, dated Jun. 3, 2013, 27 pages.
United States Patent and Trademark Office, Office Action Issued in U.S. Appl. No. 13/488,046, dated Jun. 13, 2013, 8 pages.
United States Patent and Trademark Office, Office Action Issued in U.S. Appl. No. 13/093,621, dated Jun. 20, 2013, 7 pages.

(56) References Cited

OTHER PUBLICATIONS

United States Patent and Trademark Office, Office Action Issued in U.S. Appl. No. 12/972,837, dated Jun. 26, 2013, 10 pages.
United States Patent and Trademark Office, Office Action Issued in U.S. Appl. No. 13/363,689, dated Jul. 26, 2013, 18 pages.
United States Patent and Trademark Office, Office Action Issued in U.S. Appl. No. 13/316,351, dated Jul. 31, 2013, 20 pages.
United States Patent and Trademark Office, Notice of Allowance Issued in U.S. Appl. No. 13/093,621, dated Aug. 21, 2013, 7 pages.
United States Patent and Trademark Office, Notice of Allowance Issued in U.S. Appl. No. 13/309,859, dated Sep. 4, 2013, 7 pages.
United States Patent and Trademark Office, Restriction Requirement Issued in U.S. Appl. No. 13/482,867, dated Sep. 5, 2013, 6 pages.
United States Patent and Trademark Office, Restriction Requirement Issued in U.S. Appl. No. 13/114,359, dated Sep. 10, 2013, 6 pages.
United States Patent and Trademark Office, Office Action Issued in U.S. Appl. No. 13/441,228, dated Sep. 11, 2013, 15 pages.
United States Patent and Trademark Office, Restriction Requirement Issued in U.S. Appl. No. 13/039,024, dated Oct. 1, 2013, 5 pages.
United States Patent and Trademark Office, Notice of Allowance Issued in U.S. Appl. No. 12/972,837, dated Oct. 11, 2013, 10 pages.
United States Patent and Trademark Office, Corrected Notice of Allowance Issued in U.S. Appl. No. 13/309,859, dated Oct. 29, 2013, 3 pages.
United States Patent and Trademark Office, Office Action Issued in U.S. Appl. No. 13/482,867, dated Nov. 5, 2013, 13 pages.
United States Patent and Trademark Office, Office Action Issued in U.S. Appl. No. 13/439,284, dated Nov. 8, 2013, 14 pages.
United States Patent and Trademark Office, Office Action Issued in U.S. Appl. No. 13/118,884, dated Dec. 3, 2013, 10 pages.
United States Patent and Trademark Office, Office Action Issued in U.S. Appl. No. 13/488,046, dated Dec. 10, 2013, 12 pages.
United States Patent and Trademark Office, Restriction Requirement Issued in U.S. Appl. No. 13/114,359, dated Dec. 18, 2013, 6 pages.
United States Patent and Trademark Office, Notice of Allowance Issued in U.S. Appl. No. 13/118,884, dated Feb. 4, 2014, 8 pages.
United States Patent and Trademark Office, Office Action Issued in U.S. Appl. No. 13/866,699, dated Feb. 7, 2014, 15 pages.
United States Patent and Trademark Office, Office Action Issued in U.S. Appl. No. 13/439,284, dated Feb. 10, 2014, 15 pages.
United States Patent and Trademark Office, Office Action Issued in U.S. Appl. No. 13/363,689, dated Feb. 11, 2014, 18 pages.
United States Patent and Trademark Office, Office Action Issued in U.S. Appl. No. 13/482,867, dated Feb. 21, 2014, 15 pages.
Sheridan, T. et al., "Virtual Reality Check," Technology Review, vol. 96, No. 7, Oct. 1993, 9 pages.
Bradley, M. et al., "Measuring Emotion: The Self-Assessment Manikin and the Semantic Differential," Journal of Behavior Therapy and Experimental Psychiatry, vol. 25, No. 1, Mar. 1994, 11 pages.
Granieri, J. et al., "Simulating Humans in VR," Conference of the British Computer Society, Oct. 12, 1994, 15 pages.
Kanade, T., "Development of a Video-Rate Stereo Machine," Proceedings of the 1994 ARPA Image Understanding Workshop (IUW'94), Nov. 14, 1994, Monterey, California, 4 pages.
Breen, D. et al., "Interactive Occlusion and Collision of Real and Virtual Objects in Augmented Reality," Technical Report ECRC-95-02, European Computer-Industry Research Center GmbH, Available as Early as Jan. 1, 1995, 22 pages.
Cedras, C. et al., "Motion-based recognition: a survey," Image and Vision Computing, vol. 13, No. 2, Mar. 1995, 27 pages.
Kabbash, P. et al., "The 'Prince' Technique: Fitts' Law and Selection Using Area Cursors," Proceedings of the SIGCHI Conference on Human Factors in Computing Systems (CHI '95), May 7, 1995, Denver, Colorado, 11 pages.

Freeman, W. et al., "Television control by hand gestures," Proceedings of IEEE International Conference on Automatic Face and Gesture Recognition—FGR, Jun. 26, 1995, Zurich, Switzerland, 5 pages.
Kanade, T. et al., "A Stereo Machine for Video-rate Dense Depth Mapping and Its New Applications," IEEE Computer Society Conference on Computer Vision and Pattern Recognition, Jun. 18, 1996, 7 pages.
Azarbayejani, A. et al., "Real-Time Self-Calibrating Stereo Person Tracking Using 3-D Shape Estimation from Blob Features," Proceedings of the 13th International Conference on Pattern Recognition (ICPR '96), Aug. 25, 1996, Vienna, Austria, 6 pages.
Kohler, M., "Vision Based Remote Control in Intelligent Home Environments," Proceedings of 3D Image Analysis and Synthesis 1996, Nov. 18, 1996, 8 pages.
Walker, N. et al., "Age-Related Differences in Movement Control: Adjusting Submovement Structure to Optimize Performance," The Journals of Gerontology: Series B, vol. 52B, No. 1, Jan. 1997, 14 pages.
Kjeldsen, F., "Visual Interpretation of Hand Gestures as a Practical Interface Modality," Ph.D. Dissertation, Columbia University Department of Computer Science, Available as Early as Jan. 1, 1997, 178 pages.
Maes, P. et al., "The ALIVE System: Wireless, Full-body Interaction with Autonomous Agents," Multimedia Systems—Special Issue on Multimedia and Multisensory Virtual Worlds, vol. 5, No. 2, Mar. 1, 1997, 17 pages.
Worden, A. et al., "Making Computers Easier for Older Adults to Use: Area Cursors and Sticky Icons," Proceedings of the ACM SIGCHI Conference on Human Factors in Computing Systems (CHI '97), Mar. 22, 1997, Atlanta, Georgia, 6 pages.
Becker, D. et al., "Sensei: A Real-Time Recognition, Feedback and Training System for T'ai Chi Gestures," Master's Thesis, Massachusetts Institute of Technology, May 1997, 50 pages.
Kohler, M., "Techical Details and Ergonomical Aspects of Gesture Recognition applied in Intelligent Home Environments," Technical University of Dortmund, Germany, Jun. 1997, 35 pages.
Aggarwal, J. et al., "Human Motion Analysis: A Review," Proceedings of IEEE Nonrigid and Articulated Motion Workshop 1997, Jun. 16, 1997, 13 pages.
Pavlovic, V. et al., "Visual Interpretation of Hand Gesture for Human-Computer Interaction: A Review," IEEE Transactions on Pattern Analysis and Machine Intelligence, vol. 19, No. 7, Jul. 1997, 19 pages.
Wren, C. et al., "Pfinder: Real-Time Tracking of the Human Body," IEEE Transactions on Pattern Analysis and Machine Intelligence, vol. 19, No. 7, Jul. 1997, 6 pages.
Kohler, M., "Special Topics of Gesture Recognition Applied in Intelligent Home Environments," Proceedings of the International Gesture Workshop on Gesture and Sign Language in Human-Computer Interaction, Sep. 17, 1997, Bielefeld, Germany, 12 pages.
Rigoll, G. et al., "High Performance Real-Time Gesture Recognition Using Hidden Markov Models," Proceedings of the International Gesture Workshop on Gesture and Sign Language in Human-Computer Interaction, Sep. 17, 1997, Bielefeld, Germany, 12 pages.
Miyagawa, R. et al., "CCD-Based Range-Finding Sensor," IEEE Transactions on Electron Devices, vol. 44, No. 10, Oct. 1997, 5 pages.
Shao, J. et al., "An Open System Architecture for a Multimedia and Multimodal User Interface," Improving the Quality of Life for the European Citizen, TIDE 98, Jan. 1998, 8 pages.
Yoda, I. et al., "Utilization of Stereo Disparity and Optical Flow information for Human Interaction," Sixth International Conference on Computer Vision, Jan. 4, 1998, Bombay, India, 6 pages.
Azoz, Y. et al., "Reliable Tracking of Human Arm Dynamics by Multiple Cue Integration and Constraint Fusion," Proceedings of the IEEE Computer Society Conference on Computer Vision and Pattern Recognition (CVPR '98), Jun. 23, 1998, Santa Barbara, California, 6 pages.
Darrell, T. et al., "Integrated person tracking using stereo, color, and pattern detection," Proceedings of the IEEE Computer Society Conference on Computer Vision and Pattern Recognition (CVPR '98), Jun. 23, 1998, Santa Barbara, California, 10 pages.

(56) References Cited

OTHER PUBLICATIONS

Bobick, N., "Rotating Objects Using Quaternions," Gamasutra Website, Available Online at http://www.gamasutra.com/view/feature/131686/rotating_objects_using_quaternions.php, Jul. 5, 1998, 14 pages.

Isard, M. et al., "Condensation—Conditional Density Propagation for Visual Tracking," International Journal of Computer Vision, vol. 29, No. 1, Aug. 1998, 24 pages.

Brogan, D. et al., "Dynamically Simulated Characters in Virtual Environments," IEEE Computer Graphics and Applications, vol. 18, No. 5, Sep. 1998, 12 pages.

Grace, R. et al., "A Drowsy Driver Detection System for Heavy Vehicles," Proceedings of the AIAA/IEEE/SAE Digital Avionics Systems Conference (17th DASC), Oct. 31, 1998, Bellevue, Washington, 8 pages.

Livingston, M., "Vision-based Tracking with Dynamic Structured Light for Video See-through Augmented Reality," Doctoral Dissertation, University of North Carolina at Chapel Hill, Dec. 1998, 145 pages.

Horvitz, E., "Principles of Mixed-Initiative User Interfaces," Proceedings of the SIGCHI conference on Human Factors in Computing Systems (CHI '99), May 15, 1999, Pittsburgh, Pennsylvania, 8 pages.

Long, Jr. et al., "Implications for a Gesture Design Tool," Proceedings of the SIGCHI conference on Human Factors in Computing Systems (CHI '99), May 15, 1999, Pittsburgh, Pennsylvania, 8 pages.

Hourcade, J. et al., "Architecture and Implementation of a Java Package for Multiple Input Devices (MID)," HCIL Technical Report No. 99-08, May 25, 1999, 7 pages.

Horvitz, E. et al., "A Computational Architecture for Conversation," Proceedings of the Seventh International Conference on User Modeling (UM '99), Jun. 1, 1999, 10 pages.

Berard, F., "The Perceptual Window: Head Motion as a new Input Stream," Proceedings of Interact 99—IFIP TC13 Seventh International Conference on Human-Computer Interaction, Aug. 30, 1999, Edinburgh, Scotland, 8 pages.

Zhang, Z., "Flexible Camera Calibration by Viewing a Plane from Unknown Orientations," Proceedings of the Seventh IEEE International Conference on Computer Vision (ICCV '99), Sep. 20, 1999, Kerkyra, Greece, 8 pages.

Oviatt, S., "Ten Myths of Multimodal Interaction," Communications of the ACM, vol. 42, No. 11, Nov. 1, 1999, 8 pages.

Hongo, H. et al., "Focus of Attention for Face and Hand Gesture Recognition Using Multiple Cameras," Proceedings of the Fourth IEEE International Conference on Automatic Face and Gesture Recognition (FG '00), Mar. 28, 2000, Grenoble, France, 6 pages.

Jojic, N. et al., "Detection and Estimation of Pointing Gestures in Dense Disparity Maps," Proceedings of the Fourth IEEE International Conference on Automatic Face and Gesture Recognition (FG '00), Mar. 28, 2000, Grenoble, France, 8 pages.

Pavlou, P. et al., "Measuring the Effects and Effectiveness of Interactive Advertising: A Research Agenda," Journal of Interactive Advertising, vol. 1, No. 1, Oct. 2000, 17 pages.

Wedel, M. et al., "Eye Fixations on Advertisements and Memory for Brands: A Model and Findings," Marketing Science, vol. 19, No. 4, Oct. 15, 2000, 16 pages.

Zhang, Z. "A Flexible New Technique for Camera Calibration," IEEE Transactions on Pattern Analysis and Machine Intelligence, vol. 22, No. 11, Nov. 2000, 5 pages.

Moeslund, T. et al., "A Survey of Computer Vision-Based Human Motion Capture," Computer Vision and Image Understanding, vol. 81, No. 3, Mar. 2001, 38 pages.

Wilson, A. et al., "Hidden Markov Models for Modeling and Recognizing Gesture Under Variation," Hidden Markov Models: Applications in Computer Vision, T. Caelli, ed., World Scientific, Jun. 1, 2001, 36 pages.

Toyama, K. et al., "Probabilistic Tracking in a Metric Space," Proceedings of the Eighth IEEE International Conference on Computer Vision (ICCV 2001), Jul. 7, 2001, Vancouver, Canada, 8 pages.

Zhao, L., "Dressed Human Modeling, Detection, and Parts Localization," Doctoral Dissertation, The Robotics Institute, Carnegie Mellon University, Jul. 26, 2001, 121 pages.

Althoff, F. et al., "Using Multimodal Interaction to Navigate in Arbitrary Virtual VRML Worlds," Proceedings of the 2001 Workshop on Perceptive Wser Interfaces (PUI '01), Nov. 15, 2001, Orlando, Florida, 8 pages.

Moyle, M. et al., "Gesture Navigation: An Alternative 'Back' for the Future," CHI '02 Extended Abstracts on Human Factors in Computing Systems (CHI EA '02), Apr. 20, 2002, Minneapolis, Minnesota, 2 pages.

\* cited by examiner

GESTURE RECOGNITION TECHNIQUES

RELATED APPLICATIONS

This application is a continuation of U.S. patent application Ser. No. 14/280,140 filed May 16, 2014, which is a continuation of U.S. patent application Ser. No. 13/118,884, filed May 31, 2011, now U.S. Pat. No. 8,760,395, the entire disclosure of each of which are hereby incorporated by reference.

BACKGROUND

Display and input techniques utilized by computing devices are ever evolving. For example, initial computing devices were provided with monochrome monitors. A user interacted with the computing device by viewing simple text on the monochrome monitor and entering text via a keyboard that could then be viewed on the monitor.

Display and input techniques were then expanded into use of color and graphical user interfaces. These techniques, for instance, may be utilized to show graphics to represent files, devices connected to the computing device, images, and so on using color. A user may then interact with the graphical user interface using the keyboard as well as by using a cursor control device, such as a mouse.

Display and input techniques have continued to evolve, such as to sense touch using a touchscreen display of a computing device to recognize gestures. However, these techniques often involved sensing of actual contact by a sensor that was integral to the touchscreen device and therefore limited these techniques to detection of physical interaction between the user and the computing device.

SUMMARY

Gesture recognition techniques are described. In one or more implementations, a static geometry model is generated, from one or more images of a physical environment captured using a camera, using one or more static objects to model corresponding one or more objects in the physical environment. Interaction of a dynamic object with at least one of the static objects is identified by analyzing at least one image and a gesture is recognized from the identified interaction of the dynamic object with the at least one of the static objects to initiate an operation of the computing device.

In one or more implementations, an orientation or position of a camera of a computing device in a physical environment is detected. One or more inputs are identified from one or more images captured using the camera. A gesture is recognized from a combination of the detected orientation or position of the camera and the one or more inputs that is effective to initiate an operation of one or more computing devices.

In one or more implementations, an apparatus includes a camera configured to capture depth data of a physical environment of the camera and that is included within a housing that is configured to be held by a user. The apparatus also includes one or more modules communicatively coupled to the camera and implemented at least partially in hardware. The one or more modules are configured to generate a static geometry model, from the depth data of the physical environment captured using the camera, using one or more static objects to model corresponding one or more objects in the physical environment, detect an orientation or position of the camera in the physical environment, identify interaction of a dynamic object with at least one of the static objects by analyzing at least one image, and recognize a gesture from the detected orientation or position of the camera and the identified interaction of the dynamic object with the at least one of the static objects to initiate an operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Touch-based interactions are becoming increasingly commonplace, but conventionally involve specialized sensors built into a touch-sensitive surface. However, by using the techniques as described herein, a model may be generated of a physical environment (e.g., static objects) by capturing images using a camera, such as a depth-sensing camera. The techniques may also be used to detect dynamic objects, such as hands and fingers that are moved in the physical environment. Thus, the techniques may be used to detect interaction of the dynamic objects (e.g., the hands and fingers) with static objects (e.g., a table, chair, or stationary hand) to expand touch gestures to surfaces that do not include the specialized sensors. In this way, touch-sensitive techniques can leverage arbitrary surfaces in the physical environment, e.g., including parts of a user.

Further, the techniques described herein may support gestures that may be defined based on a position or orientation of a camera as well as images detected by the camera. For example, the techniques may be able to detect a position or orientation of a camera (e.g., worn as part of a pair of glasses, part of a mobile phone or tablet, and so on) within the physical surroundings of the camera. The camera may also be used to identify a position or orientation of one or more body parts of a user from images taken by the camera, e.g., movement of a hand to make a grasping motion. The combination of the position or orientation of the camera and the use of images captured by the camera may be used to define gestures to initiate an operation of a computing device. Further discussion of which techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
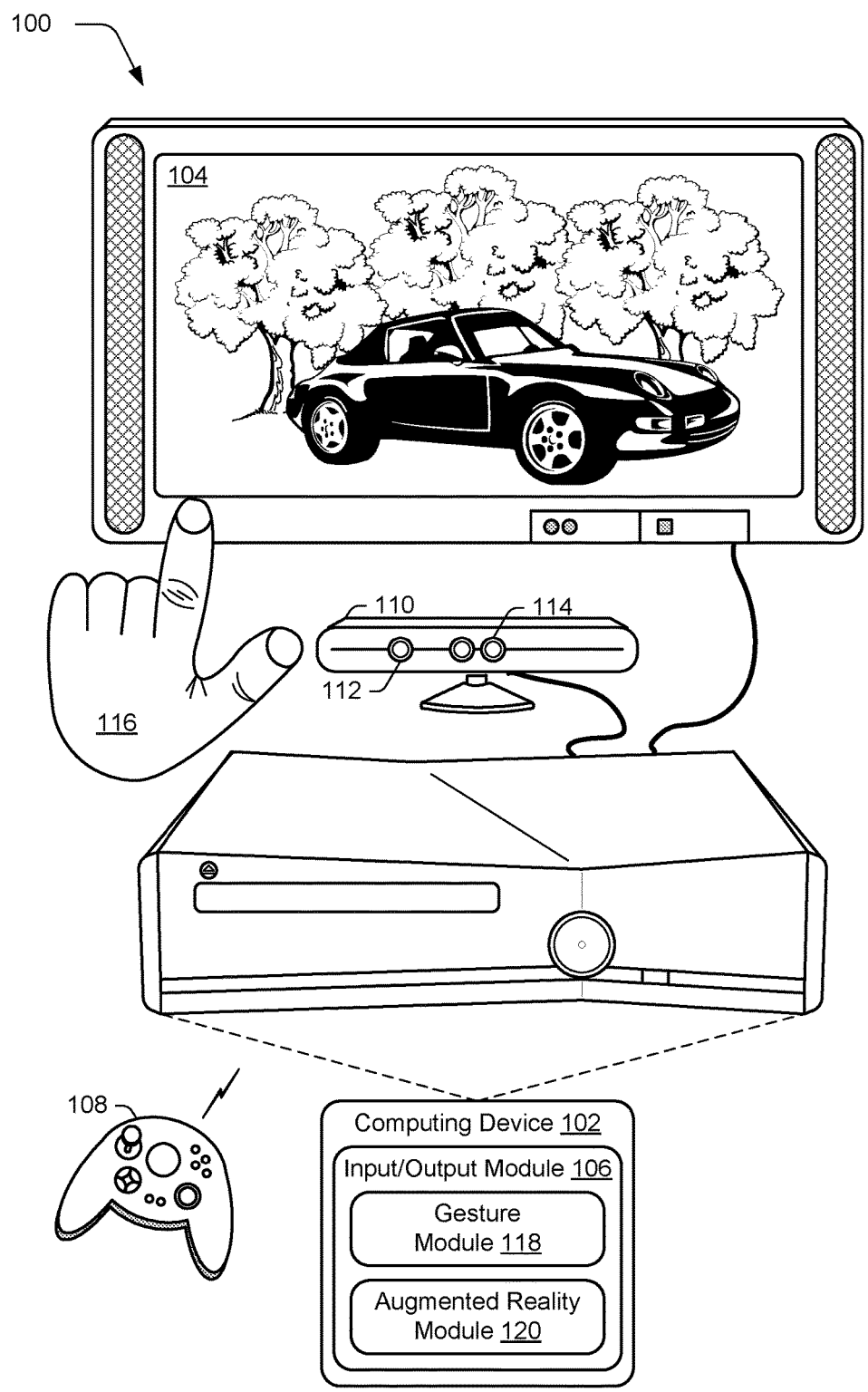
FIG. 1 is an illustration of an environment in an example implementation that is operable to employ gesture techniques described herein.

FIG. 1 is an illustration of an environment 100 in an example implementation that is operable to employ gesture techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, a wireless phone, a tablet, a netbook, and so forth as further described in relation to FIG. 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, and cause operations to be performed that correspond to the inputs. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102 via a touchscreen), and other devices that involve touch on the part of a user or object.

The input/output module 106 may also be configured to provide a natural user interface (NUI) that may recognize gestures that do not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures through examination of images captured by one or more cameras 112, 114 of the computing device 102. The cameras 112, 114, for instance, may be configured to include multiple lenses and sensors so that different perspectives may be captured and thus determine depth, such as through analysis of a grid projected in a physical environment of the computing device 102. The different perspectives may then be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 116 and/or movement of the user's hand 116 as a whole.

Thus, the motions may be identified as gestures by the input/output module 106 using a gesture module 118 to initiate a corresponding operation. A variety of different types of gestures may be recognized, such a gestures that are recognized from a single type of input (e.g., a motion gesture) as well as gestures involving multiple types of inputs, e.g., a gesture recognized from an image captured by the cameras 112, 114 as well as defined based on a position or orientation of the cameras 112, 114 in a physical environment, which is further described in relation to FIG. 2. Additionally, the gestures may be used for a variety of purposes, such as to cause an augmentation to be generated by an augmented reality module 120 for use as part of an augmented reality display, further discussion of which may be found in relation to FIG. 3.

Accordingly, the gesture module 116 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the input/ output module 106 may provide a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices.

Figure 2:
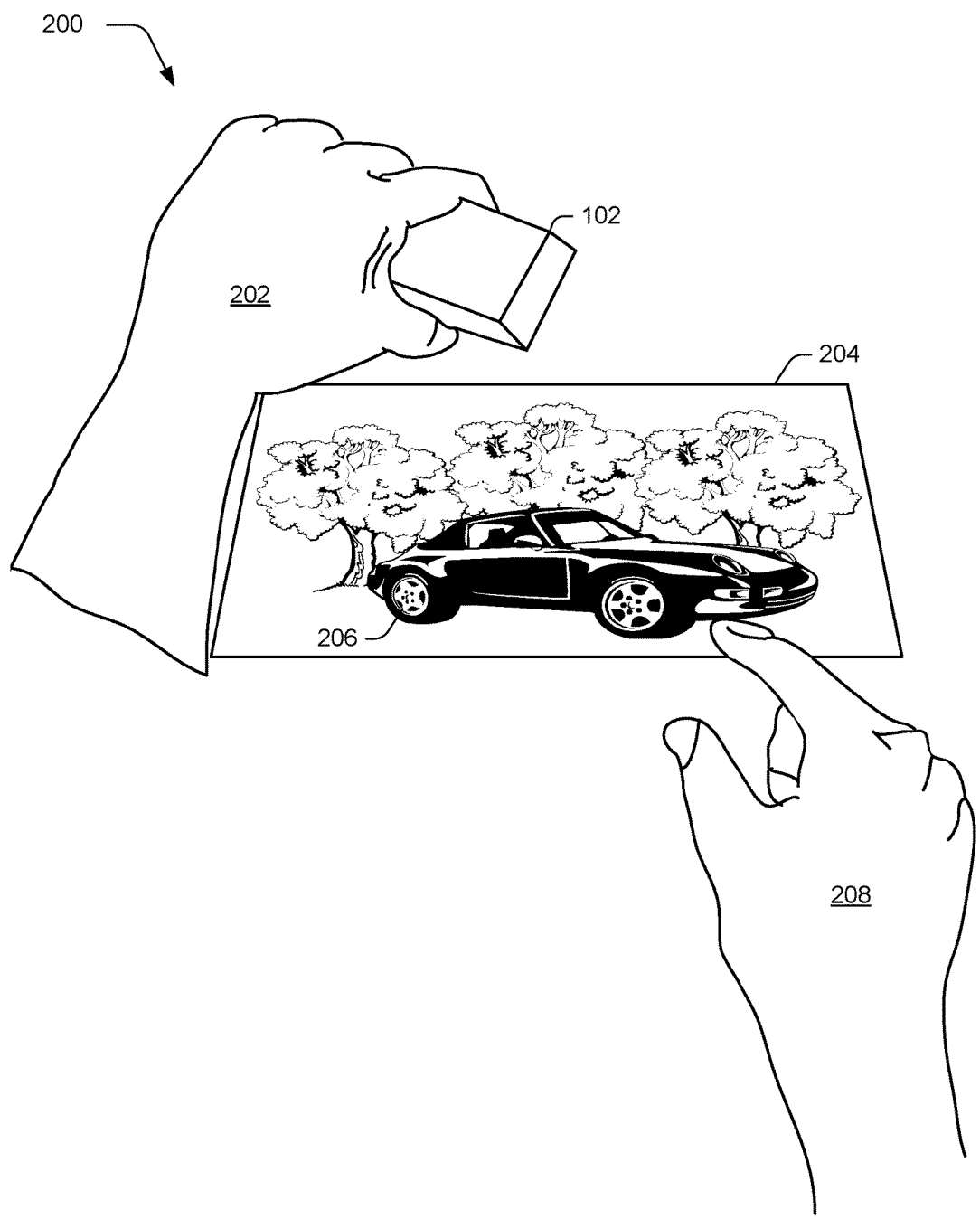
FIG. 2 depicts a system in an example implementation in which a system is illustrated that supports gestures defined based on position or orientation of a camera of the computing device as well as from inputs identified from images captured using the camera.

FIG. 2 depicts a system 200 in an example implementation in which a system is illustrated that supports gestures defined based on position or orientation of a camera of the computing device as well as from inputs identified from images captured using the camera. In this example, the computing device 102 is configured to be held in a user's hand 202, such as a mobile phone, game device, and so on. The computing device 102 as previously described includes a camera (not shown) that captures at least part of a physical environment.

For example, the computing device 102 may capture images to generate a dense three-dimensional model using the camera that contains static objects of the physical environment. In the illustrated implementation, a surface 204 is modeled as a static geometric object and an image 206 of a car and trees is projected by the computing device 102. The image 206 may be projected by the computing device 102 using an aspect ratio and size based on a determination of position and orientation of the computing device 102 in the physical environment. Thus, the computing device 102 may leverage the determination of position and orientation in the physical environment to alter how the device interacts with the physical environment.

For example, a main interaction surface may be extracted and analyzed to model a physical environment as follows. A portion of a surface may be sampled by projecting orthographic rays onto an empty spot of the surface in a dense 3D model. The sampled normal and position values may then be averaged and used to generate a new view matrix for a virtual camera. The surface plane may then be captured by performing an orthographic projection using the previously calculated view matrix and narrow near and far clipping planes. From this, the main surface may be detected and noise removed using a connected components algorithm. Edges and geometrical shapes (e.g., rectangle, triangle, circle, and so on) may then be modeled using computer vision algorithms to generate static objects that represent the environment.

The computing device 102 may also leverage images and other sensors of the computing device 102 to detect interaction with the user interface. For example, the computing device 102 may capture an image of another hand 208 of a user as interacting with the image 206 displayed on the surface 204. A gesture may be recognized from this movement that is configured to initiate an operation of the computing device 102. In the illustrated example, for instance, the gesture may involve "painting" colors onto the car, repositioning the car in the image 206, selecting another car, and so on.

Further, a gesture may be recognized from a combination of the position or orientation of the computing device 102 and inputs detected from the image, e.g., the other user's hand 208. Continuing with the previous example, a scale and skew of the "painting" gesture may be adjusted to follow the image 206. Thus, a definition of a gesture in this example may leverage what is detected through examining an image taken by the camera as well as an orientation or position of the camera in a physical environment. Thus, position and orientation of the camera of the computing device (as well as other parts of the computing device) may be determined in a variety of ways, examples of which are further described in relation to FIG. 3.

In this way, an arbitrary scene may be captured in a dense 3D model using a camera. Once the environment has been sufficiently captured, real-time depth data captured with the camera (e.g., moving) can be used to detect dynamic objects that are touching a part of the dense model of the scene, e.g., the static objects modeled in the scene. Additionally, arbitrary touch interaction may be extended in such way that the size and the proximity of a touching object can be used to enable multi-scale interaction. For example, a user could paint on a surface with their whole arm or by just using a hand (e.g. by resting a forearm on the table) and implicitly control the fidelity of the paint (e.g. by changing the shape and width of the brush strokes). A skeletal hand tracker may be used to detect the body parts are actively used in the interaction as described in relation to FIG. 1.

Once the depth camera has acquired a reference point in the scene (e.g., a fixed position in space, tracked hand or object, etc.) parameters describing the camera's spatial relationship to the reference point may be used in subsequent interactions. For example, a hand could be used to control high-level movement of a virtual character when the camera captures the scene where the hand could be used to control finer movements of the character's limbs or face depending on how close the camera is being held and where it is pointing.

Further, by tracking the fingers of both hands as previously described, a first hand may act as a base for virtual control elements. An advantage of this approach is that it is fairly straightforward to map different virtual controls to different parts of the hand. This allows a user to feel the touch and clear boundaries between different virtual objects by gliding with a finger on the hand. This is also beneficial when the user wants to focus their attention to a different part of a scene as the user can interact with both of their hands without looking at them.

Other hand pressure can be also simulated by touch. For example, an increase of pressure may be simulated by taking the relative offset of the touch contact point along the touch axis to the initial contact point in space. This can be useful to enable finer control of the position in mid-air, as resistance with the other hand resting on a surface can increase the range of applied force. This may be implemented for a variety of different functionality, such as buttons coupled with linear parameters (e.g., light with dimming, virtual brush with variable width) or individual 3D points in a cluttered point cloud that the user wants to move. A variety of other examples are also contemplated.

The images captured by the computing device 102 may also be used to support a variety of other techniques to support interaction of the computing device 102 with the physical environment. For example, images captured by the camera 112 may be used to identify devices in the physical environment that surrounds the computing device 102. The computing device 102 may then configure a user interface to interact with the identified device, such as a display device illustrated as a television in FIG. 1, a mobile communication device such as a user's mobile phone, a game console, and so forth.

Although a number of examples of user interfaces and gesture interactions have been described, it should be readily apparent that a wide variety of other gestures and user interfaces may leverage the techniques described herein, another example of which is an augmented reality display as further described in relation to the following figure.

Figure 3:
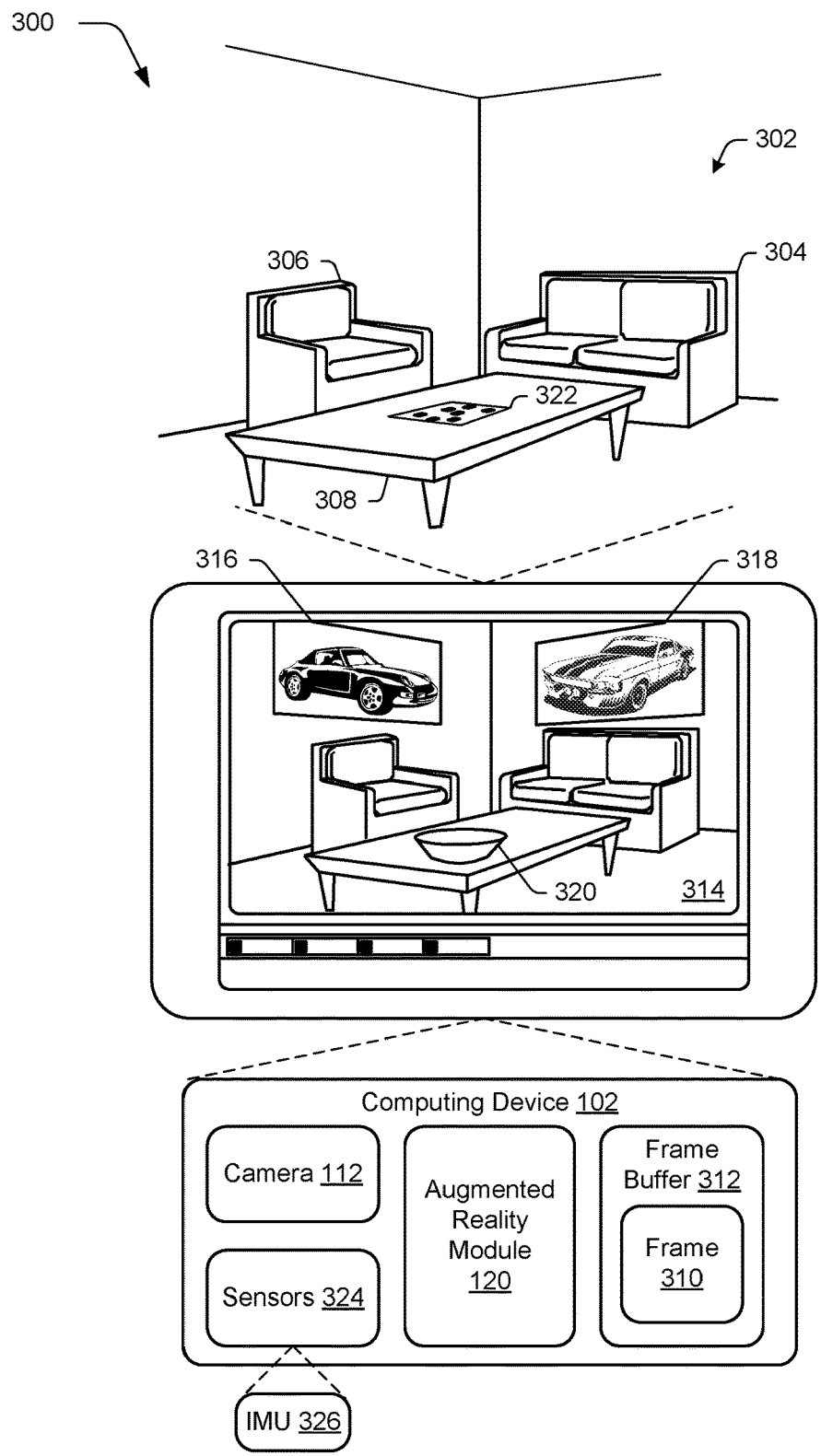
FIG. 3 is an illustration of a system in an example implementation showing used of gestures in an augmented reality system.

FIG. 3 is an illustration of an environment 300 in an example implementation that is operable to employ augmented reality techniques. The illustrated environment 300 includes the computing device 102 configured as a tablet computer. The computing device 102 is also illustrated as including the augmented reality module 120 of FIG. 1. The augmented reality module 120 is representative of functionality of the computing device 102 to augment a view of real-world physical surroundings of the computing device 102. In the illustrated example, for instance, the computing device 102 is illustrated as being physically present in a room 302 that has a couch 304, a chair 306, and a table 308 that are positioned in a corner of the room 302.

As previously described, the computing device 102 includes a camera 112 that is configured to capture one or more images of the physical surroundings of the computing device 102, e.g., the room 302 in this example. These one or more images may be used to capture a view of the "reality" that is to be augmented, although other input devices are also contemplated such as microphones. The augmented reality module 120 may receive data from the camera 112 (e.g., the one or more images) to generate a frame 310, which is illustrated as being stored in a frame buffer 312 of the computing device 102.

The frame 310 may then be displayed by a display device 314 of the computing device 102, which although illustrated as part of a mobile communication device configuration that is illustrated may assume a variety of configurations. In one or more implementations, the display device 314 may be included as part of a helmet or glasses and positioned for viewing by one or more of a user's eyes. Additionally, the display device 314 may or may not be partially transparent. For example, the display device 314 may be configured to display both the image captured by the camera 112 along with augmentations. In another example, the display device 314 may be configured to display the augmentations without the view of the image captured by the camera 112, but permit a view of the physical surroundings to be seen through at least a portion of the display device 314. Thus, the augmentation generated by the augmented reality module 120 may be displayed in a variety of ways.

In the illustrated example, the frame 310 displayed by the display device 314 includes an image captured by the camera 112. The frame 310 also includes a plurality of augmentations that were generated by the augmented reality module 120. Illustrated examples displayed by the display device 314 include first and second pictures 316, 318 that appear positioned on walls of the room 302 as well as a bowl 320 that appears to be placed on the table 308. Thus, the augmented reality module 120 may augment the view of reality displayed by the display device 314 to provide a user interface via which a user may interact with using the gestures previously described. It should be readily apparent that augmentations generated by the augmented reality module 120 may assume a variety of other forms, such as objects as part of a game, projection of the image 206 in FIG. 2, and other changes to a view of the surroundings of a computing device 102.

To generate this view and know "where" to place to augmentations, the augmented reality module 120 may leverage a variety of techniques to determine an orientation and/or position of the computing device 102 in relation to the environment, e.g., the room 302 as illustrated. For example, the augmented reality module 120 may leverage one or more markers to determine how the computing device 102 is positioned, oriented, moved, and so on. In this way, the computing device 102 may determine an orientation or position from images taken by the camera 112.

These markers may take a variety of forms. For instance, the augmented reality module 120 may set one or more view points in the living room as markers and thus serve as a basis to determine orientation and/or positioning using feature extraction as described in relation to FIG. 2, such as a corner of the table 308, orientation of the chair 306, and so on. Thus, the items in the room may act as a basis to determine where the computing device 102 is located within the room.

In another instance, the augmented reality module 120 may leverage a view of one or more augmented reality (AR) tags that are physically positioned within the surrounding environment of the computing device 102. An example AR tag 322 is illustrated as positioned on the table 308 in the living room 302. Although a single AR tag 322 is shown, a plurality of AR tags may be utilized in the environment. The example AR tag 322 (or other markers) may be used as a basis to determine depth (e.g., distance between the AR tag 322 and the camera 112), three-dimensional orientation of the computing device 102 with respect to the AR tag 322, and so forth.

For example, the AR tag 322 may include a pattern that may be recognized by the augmented reality module 120 to determine a distance from the AR tag 322 and/or an orientation of the computing device 102 in relation to the AR tag 322. In this way, markers may be leveraged by the augmented reality module 120 to determine "where" and "how" the computing device 102 is positioned in a physical environment. The augmented reality module 120 may use this determination as a basis to generate augmentations to be output for viewing by a user of the computing device 102.

The augmented reality module 120 may also leverage one or more sensors 324 to determine and verify a position and/or orientation of the computing device 102. For example, the sensors 324 may be configured as an inertial measurement unit (IMU), which may include a gyroscope, one or more accelerometers, a magnetometer, and so on including any combination thereof. Thus, the computing device 102 may employ a variety of different techniques to determine a position or orientation in a physical environment.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

For example, the computing device 102 may include an entity (e.g., software) that causes hardware of the computing device 102 to perform operations, e.g., processors, functional blocks, and so on. The computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Procedures

Figure 4:
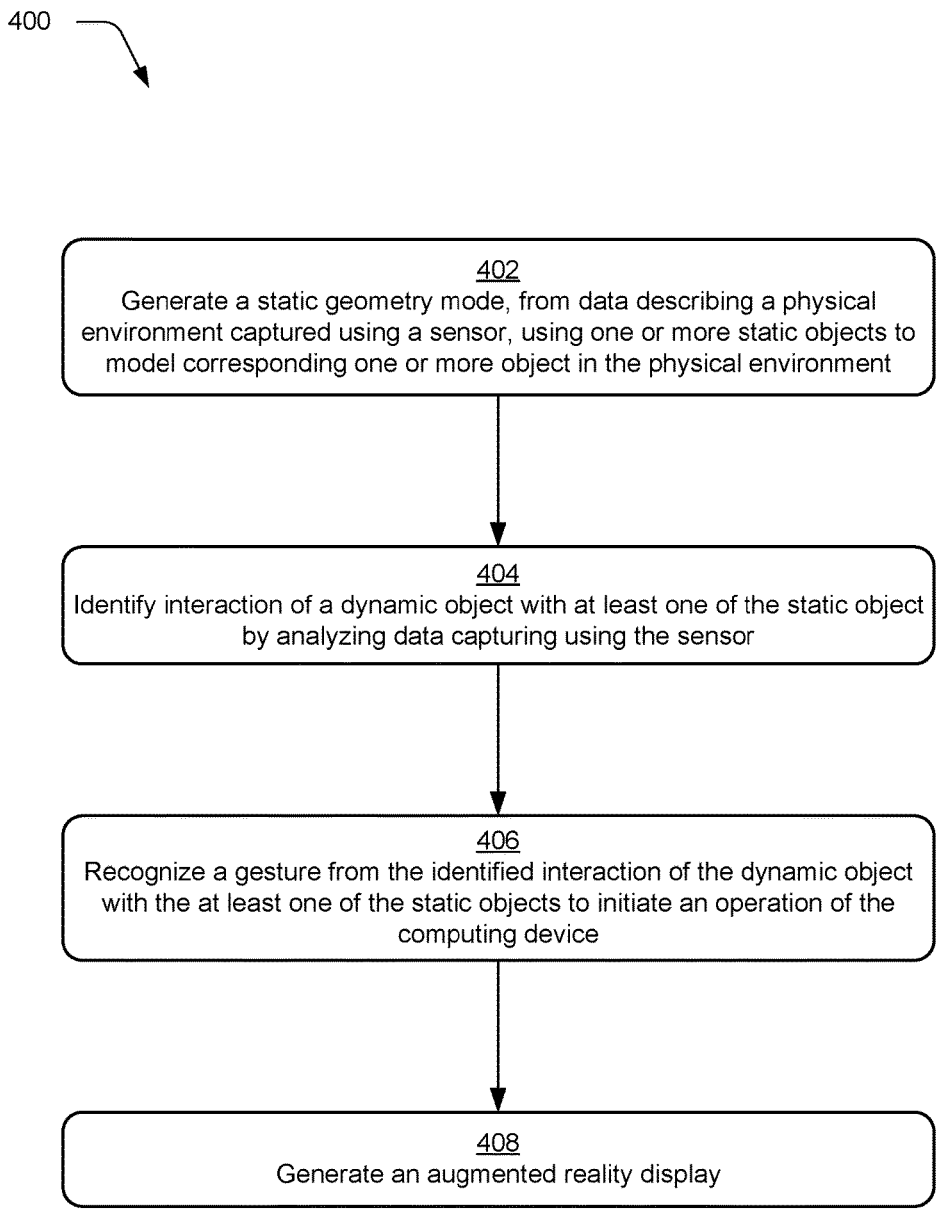
FIG. 4 is a flow diagram depicting a procedure in an example implementation in which a static geometry model is generated and used as a basis to recognize gestures.

The following discussion describes gesture techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment FIG. 4 is a flow diagram depicting a procedure in an example implementation in which a static geometry model is generated and used as a basis to recognize gestures. A static geometry model is generated, from data describing a physical environment captured using a sensor, using one or more static objects to model corresponding one or more objects in the physical environment (block 402). For example, the computing device 102 may examine images captured by the camera 112 to extract features and describe those features using static object to model a physical environment. A variety of other sensors and data are also contemplated, such as laser range finder which may be used to generate data that can be used to infer geometry of a scene.

Interaction of a dynamic object with at least one of the static objects is identified by analyzing the data (block 404). Continuing with the previous example, the images or other data may be used to determine that a relatively stationary object (e.g., a user's hand) has been touched by a dynamic object, e.g., another hand of the user. Thus, the static objects may be defined using a threshold whereas a dynamic object may be defined as object that exhibits movement above that threshold. Other techniques are also contemplated, such as to use a body part classification system to classify which movement is to be used to define a gesture.

A gesture is recognized from the identified interaction of the dynamic object with the at least one of the static objects to initiate an operation of the computing device (block 406). The gesture, for instance, may be detected from images that describe that a dynamic object has touched the static object above, defined as movement in relation to the static object, and so forth. Thus, the model of the physical environment may serve as a basis for recognizing gestures detected using images captured by the camera.

An augmentation is generated by the computing device for display as part of an augmented-reality display based least in part on the combined basis (block 408). A variety of different augmentations may be generated, such as objects to be viewed via a display device, directional audio, tactile feedback, and so forth. For example, augmentations may be displayed along with a view of a physical environment, an example of which is shown in FIG. 3 in which the display device 314 includes first and second pictures 316, 318 that appear positioned on walls of the living room 302 as well as a bowl 320 that appears to be placed on the table 308 that otherwise is not included in the physical room 302 itself. In this way, the display may augment reality with additional information. Additionally, the display may be performed using a variety of different display devices, such as display devices integrated in a tablet or mobile phone, part of a user-wearable item (e.g., a helmet), a standalone display device as typically found on a desktop, part of a laptop or netbook, and so forth.

Figure 5:
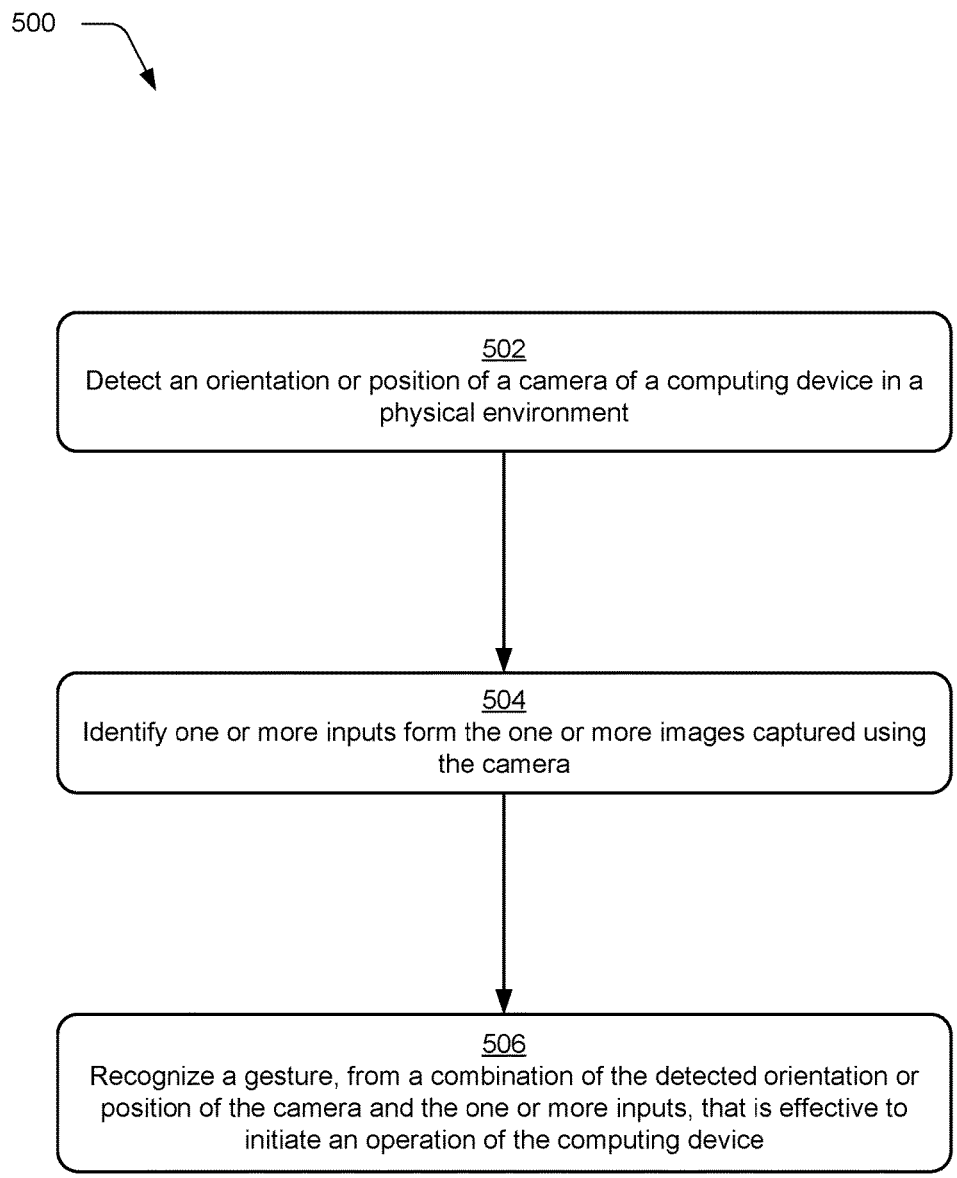
FIG. 5 is a flow diagram depicting a procedure in an example implementation in which a combination of an orientation or position of a camera of computing device and one or more inputs identified from images taken by the camera are used to recognize a gesture.

FIG. 5 depicts a procedure 500 in an example implementation in which a combination of an orientation or position of a camera of computing device and one or more inputs identified from images taken by the camera are used to recognize a gesture. An orientation or position of a camera of the computing device in a physical environment is detected (block 502). This orientation or position may be determined in a variety of ways, such as from images captured using the camera 112, sensors 324 of the computing device 102, and so on.

One or more inputs are identified from one or more images captured using the camera (block 504). A gesture is recognized from a combination of the detected orientation or position of the camera and the one or more inputs that is effective to initiate an operation of one or more computing devices (block 506). The gesture module 120, for instance, may detect movement of objects (e.g., body parts of a user), position, orientation, and so on from images captured by the camera. Further, this identification may also leverage other inputs to define the gesture, such as position or orientation of the camera 112 as described in relation to FIG. 2.

Example System and Device

Figure 6:
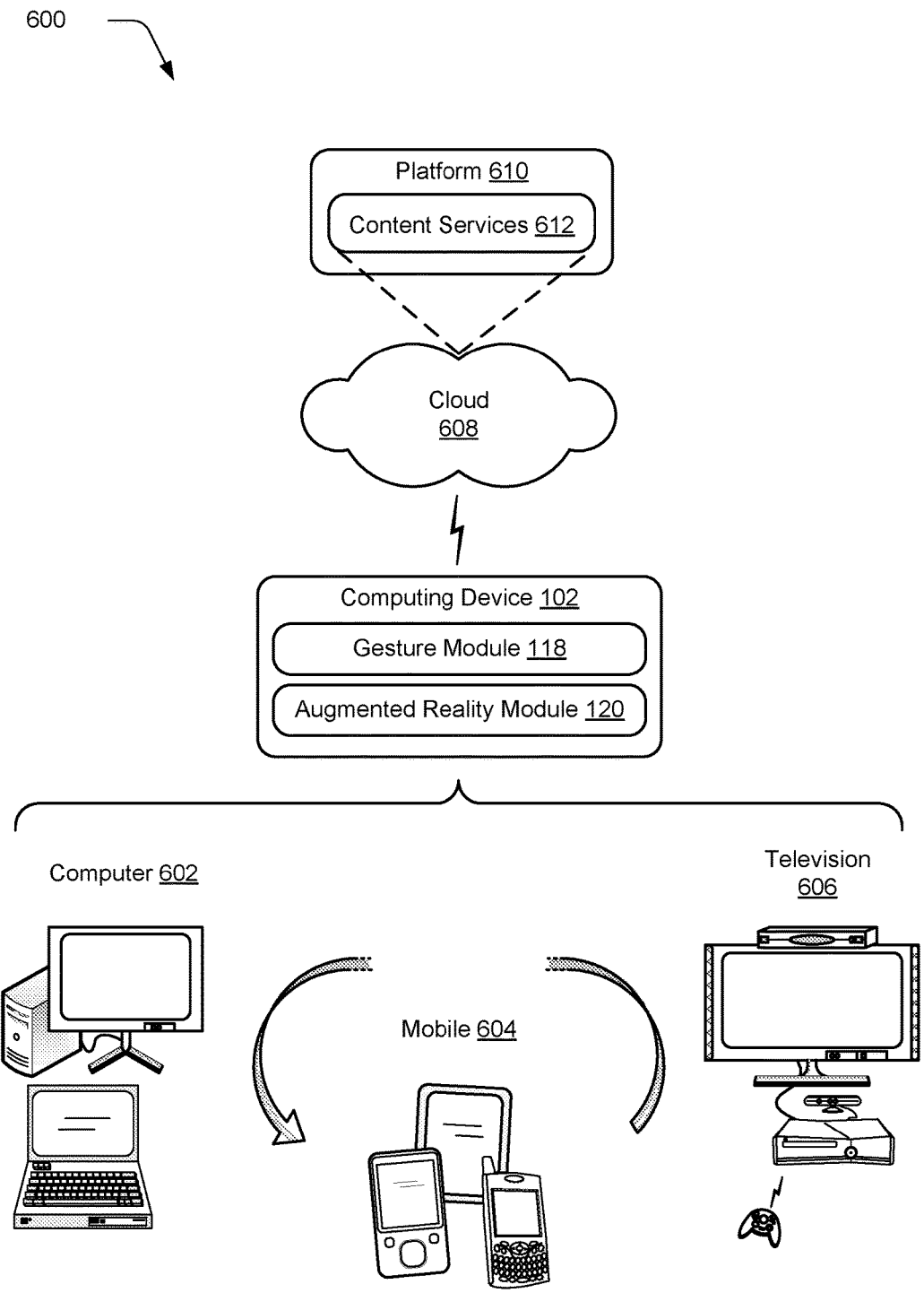
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 602 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein represented by the gesture module 118 and augmented reality module 120 may be supported by these various configurations of the computing device 102 and are not limited to the specific examples the techniques described herein, as well as "over the could" as described below.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
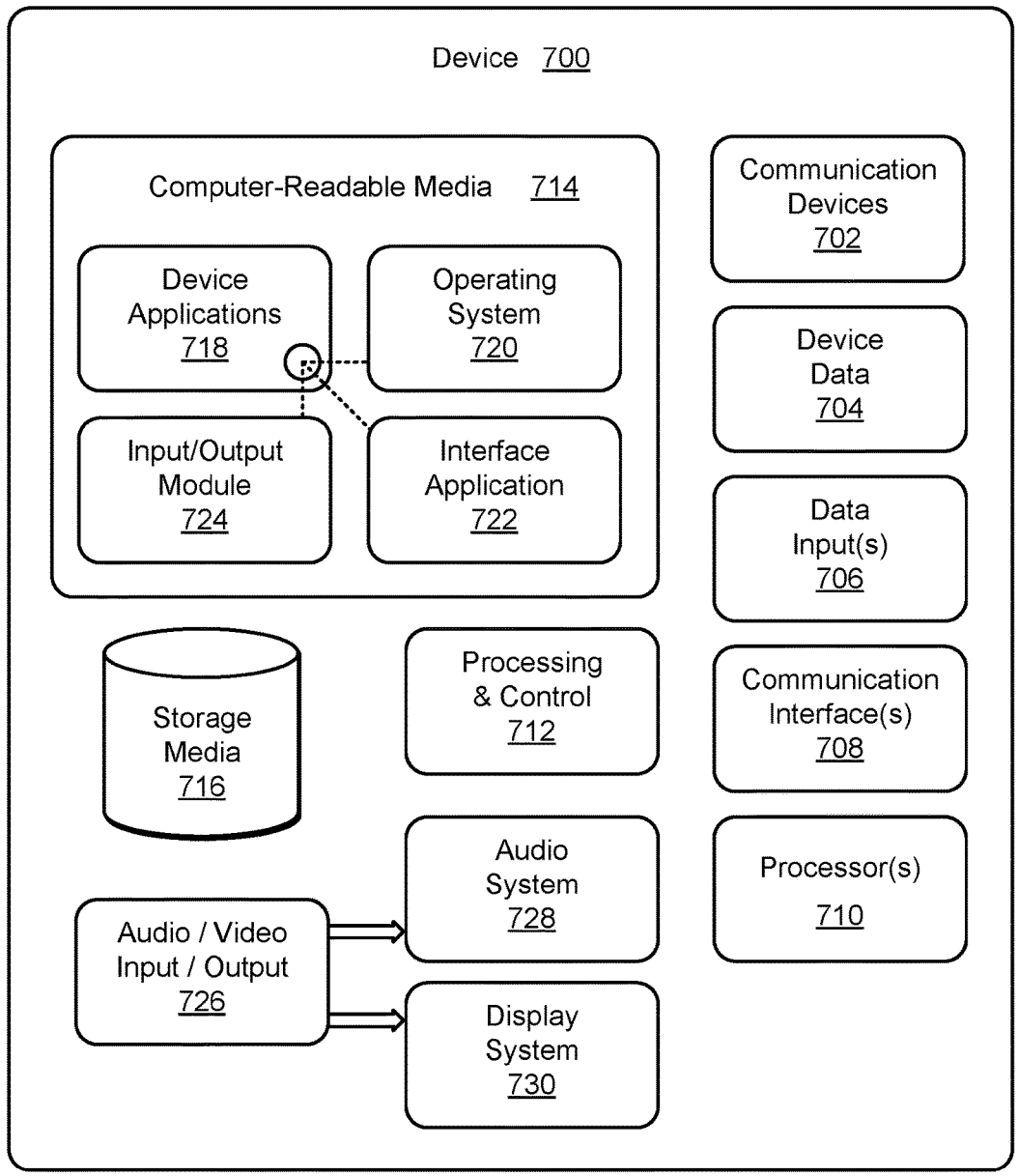
FIG. 7 illustrates various components of an example device that can be implemented as any type of computing device as described with reference to FIGS. 1, 2, and 6 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the gesture techniques described herein. In this example, the device applications 718 include an interface application 722 and an input/output module 724 (which may be the same or different as input/output module 114) that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. A method implemented by a computing device, the method comprising:
via a sensor, capturing depth data corresponding to a physical environment;
based at least in part on using the depth data corresponding to the physical environment, forming at least one model of a static physical object;
identifying interaction of a dynamic object with the at least one model of the static physical object, the at least one model of the static physical object modeling one or more objects in the physical environment using a geometry model; and
recognizing a gesture from the identified interaction of the dynamic object with the at least one model of the static physical object to initiate an operation of the computing device.

2. A method as described in claim 1, wherein the identified interaction includes identifying contact between the dynamic object and the at least one of the static objects by analyzing the data.

3. A method as described in claim 1, further comprising generating the geometry model using one or more images captured by the sensor, and wherein identifying the interaction of the dynamic object with the at least one model of the static physical object comprises using at least one image captured subsequent to the one or more images that were used to generate the geometry model.

4. A method as described in claim 1, wherein the sensor is a camera and the data includes images captured by the camera.

5. A method as described in claim 1, wherein the operation is to form a communication that identifies the gesture for communicating to another computing device to initiate another operation of the other computing device.

6. A method as described in claim 1, wherein the model of the static physical object comprises a displayed image including the physical object.

7. A method as described in claim 1, wherein the geometry model comprises a static geometry model.

8. A method implemented by a computing device, the method comprising:
via a sensor, capturing depth data corresponding to a physical environment;
based at least in part on using the depth data corresponding to the physical environment, forming at least one model of a static physical object;
identifying contact between a dynamic object and the at least one model of the static physical object, the at least one model of the static physical object modeling one or more objects in the physical environment; and
recognizing a gesture from the identified contact of the dynamic object with the at least one model of a static physical object to initiate an operation of the computing device.

9. A method as described in claim 8, further comprising generating the at least one model of the static physical object using one or more images captured by the sensor, and wherein identifying the contact between the dynamic object and the at least one model of the static physical object comprises using at least one image captured subsequent to the one or more images that were used to generate the at least one model of the static physical object.

10. A method as described in claim 8, wherein the sensor is a camera and the data includes images captured by the camera.

11. A method as described in claim 8, wherein the operation is to form a communication that identifies the gesture for communicating to another computing device to initiate another operation of the other computing device.

12. A method as described in claim 8, wherein the model of the static physical object comprises a displayed image including the physical object.

13. A method as described in claim 8, wherein the model of the static physical object models one or more objects in the physical environment using a static geometry model.

14. An apparatus comprising:
a camera configured to capture depth data of a physical environment of the camera and included within a housing that is configured to be held by a user; and
one or more modules communicatively coupled to the camera and implemented at least partially in hardware, the one or more modules configured to perform operations comprising:
based at least in part on using the depth data corresponding to the physical environment, forming at least one model of a static physical object;
identifying interaction of a dynamic object with the at least one model of the static physical object, the at least one model of the static physical object modeling one or more objects in the physical environment using a geometry model; and
recognizing a gesture from the identified interaction of the dynamic object with the at least one model of the static physical object to initiate an operation of the computing device.

15. An apparatus as described in claim 14, wherein the identified interaction includes identifying contact between the dynamic object and the at least one of the static objects by analyzing the depth data.

16. An apparatus as described in claim 14, wherein the geometry model is generated using one or more images captured by the camera, and wherein identifying the interaction of the dynamic object with the at least one model of the static physical object comprises using at least one image captured subsequent to the one or more images that were used to generate the geometry model.

17. An apparatus as described in claim 14, wherein the depth data includes images captured by the camera.

18. An apparatus as described in claim 14, wherein the operation is to form a communication that identifies the gesture for communicating to another computing device to initiate another operation of the other computing device.

19. An apparatus as described in claim 14, wherein the model of the static physical object comprises a displayed image including the physical object.

20. An apparatus as described in claim 14, wherein the geometry model comprises a static geometry model.

\* \* \* \* \*

UNITED STATES PATENT AND TRADEMARK OFFICE
CERTIFICATE OF CORRECTION

PATENT NO. : 10,331,222 B2
APPLICATION NO. : 15/162905
DATED : June 25, 2019
INVENTOR(S) : David Kim et al.

Page 1 of 1

It is certified that error appears in the above-identified patent and that said Letters Patent is hereby corrected as shown below:

In the Specification

In Column 6 Line 19, insert --that-- after "be used to detect the body parts"

Signed and Sealed this
Tenth Day of September, 2019

Andrei Iancu
*Director of the United States Patent and Trademark Office*